United States Patent
Tanaka et al.

(10) Patent No.: US 9,621,436 B2
(45) Date of Patent: Apr. 11, 2017

(54) DEVICE COOPERATION SERVICE EXECUTION APPARATUS, DEVICE COOPERATION SERVICE EXECUTION METHOD, AND COMPUTER-READABLE RECORDING MEDIUM

(71) Applicant: Panasonic Intellectual Property Corporation of America, Torrance, CA (US)

(72) Inventors: Keiichi Tanaka, Osaka (JP); Yuki Taoka, Kyoto (JP); Kenji Masuda, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 381 days.

(21) Appl. No.: 13/989,220

(22) PCT Filed: Oct. 3, 2012

(86) PCT No.: PCT/JP2012/006335
§ 371 (c)(1),
(2) Date: May 23, 2013

(87) PCT Pub. No.: WO2013/061517
PCT Pub. Date: May 2, 2013

(65) Prior Publication Data
US 2014/0075003 A1 Mar. 13, 2014

(30) Foreign Application Priority Data
Oct. 27, 2011 (JP) ................................. 2011-236217

(51) Int. Cl.
*H04L 12/24* (2006.01)
*H04L 12/64* (2006.01)

(52) U.S. Cl.
CPC .......... *H04L 41/50* (2013.01); *H04L 12/6418* (2013.01); *H04L 41/085* (2013.01)

(58) Field of Classification Search
CPC ....................................................... H04L 41/50
See application file for complete search history.

(56) References Cited

U.S. PATENT DOCUMENTS 7,076,543 B1    7/2006 Kirti et al.
2002/0147791 A1*  10/2002 Choi .............................. 709/217
(Continued)

FOREIGN PATENT DOCUMENTS

JP    2004-348711    12/2004
JP    2007-133796    5/2007
(Continued)

OTHER PUBLICATIONS

Chinese Office Action issued Sep. 1, 2015 in corresponding Chinese Patent Application No. 201280003830.9 (with English translation).
(Continued)

*Primary Examiner* — Jerry Dennison
(74) *Attorney, Agent, or Firm* — Wenderoth, Lind & Ponack, L.L.P.

(57) ABSTRACT

An application information acquisition unit transmits a device list of unconnected devices, which are owned devices recorded in a local storage but not retrieved by a device retrieval unit, and connected devices, which are owned devices retrieved by the device retrieval unit, to an external server via an external network. A service list display unit displays a list of device cooperation services indicated in device cooperation service list information obtained by the application information acquisition unit from the external server and a list of devices determined to be owned devices
(Continued)

by an owned device management unit on a display unit, whereby a user is prompted to select a device cooperation service.

12 Claims, 21 Drawing Sheets

(56) References Cited

U.S. PATENT DOCUMENTS

| | | | |
|---|---|---|---|
| 2004/0249924 A1* | 12/2004 | Watanabe et al. | 709/223 |
| 2007/0112909 A1 | 5/2007 | Miyamoto et al. | |
| 2007/0250458 A1* | 10/2007 | Watanabe et al. | 705/500 |
| 2008/0092184 A1* | 4/2008 | Kim | H04L 65/4084 725/110 |
| 2009/0138897 A1 | 5/2009 | Onogi et al. | |
| 2010/0250735 A1* | 9/2010 | Andersen | 709/224 |
| 2011/0222466 A1* | 9/2011 | Pance | H04Q 3/0029 370/316 |
| 2011/0265006 A1* | 10/2011 | Morimura | G06F 11/0727 715/736 |
| 2012/0173767 A1* | 7/2012 | Kim | G06F 9/4411 710/11 |
| 2012/0179781 A1 | 7/2012 | Onogi et al. | |

FOREIGN PATENT DOCUMENTS

| | | |
|---|---|---|
| JP | 2009-129198 | 6/2009 |
| JP | 2010-232715 | 10/2010 |
| WO | 2005/066808 | 7/2005 |

OTHER PUBLICATIONS

International Search Report issued Jan. 15, 2013 in International (PCT) Application No. PCT/JP2012/006335.

* cited by examiner

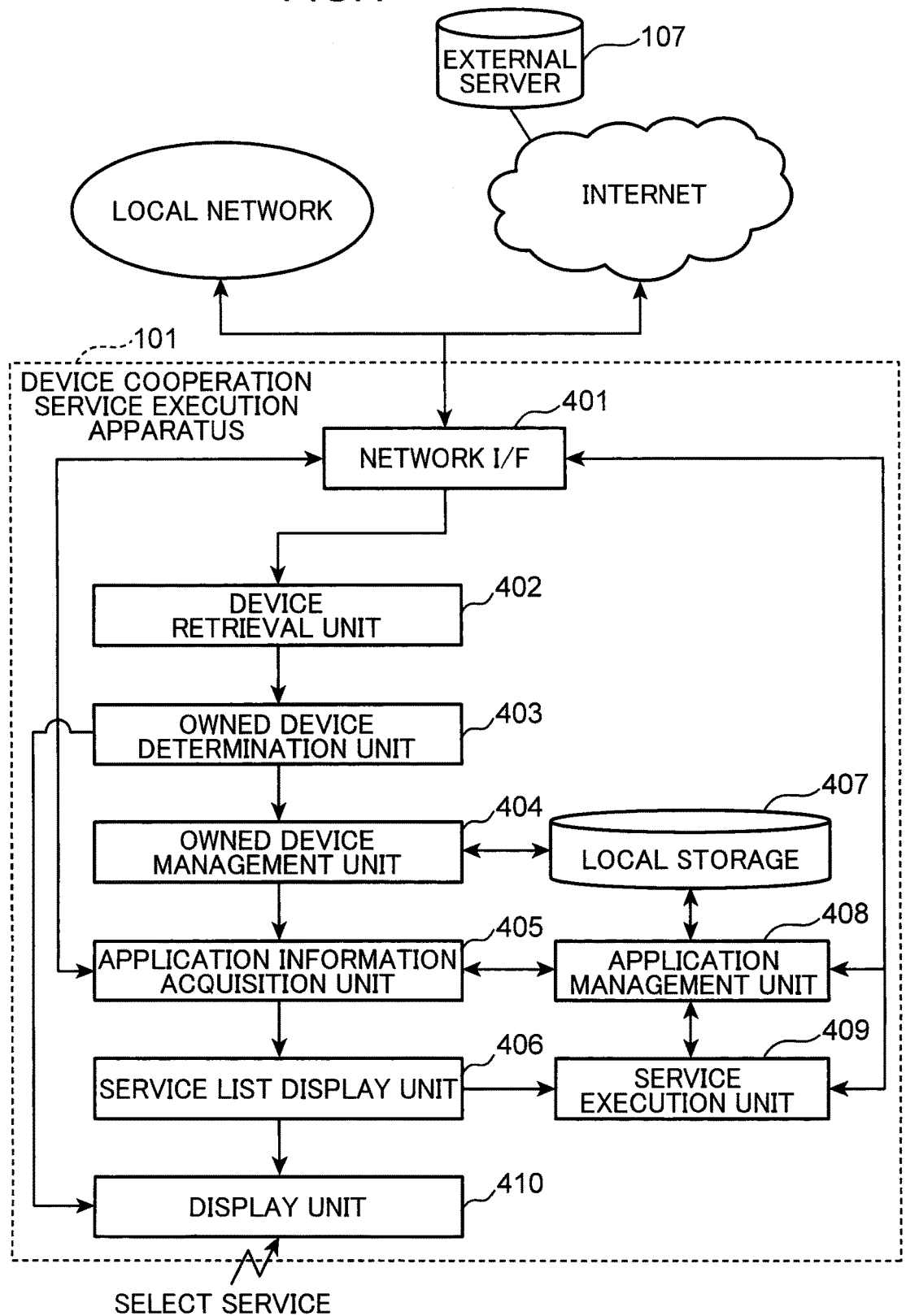

FIG.5

| DEVICE NAME | DEVICE ID | MODEL NUMBER | MANUFACTURER NAME | DEVICE IP ADDRESS | ICON URL |
|---|---|---|---|---|---|
| TELEVISION | 12345678-90ab-cdef-1234-56789abcdef0 | TV-100 | ○○○○○ | 192.168.11.1 | http://192.168.11.1:80/icon.png |
| BD RECORDER | 12345678-90ab-cdef-1234-56789abcdef1 | RECORDER-200 | ○○○○○ | 192.168.11.2 | http://192.168.11.2:80/icon.png |
| DIGITAL CAMERA | 12345678-90ab-cdef-1234-56789abcdef2 | DSC-001 | ○○○○○ | 192.168.11.3 | http://192.168.11.3:80/icon.png |
| PORTABLE PLAYER | 12345678-90ab-cdef-1234-56789abcdef3 | AVPLAYER-50 | ○○○○○ | 192.168.11.4 | http://192.168.11.4:80/icon.png |

DISPLAY LISTS OF DEVICES AND SERVICES

FIG.8

| APPLICATION ID | tvapp |
|---|---|
| SERVICE NAME | TELEVISION VIEWING |
| SUMMARY | WATCH TV |
| VERSION | 1.0 |
| DISTRIBUTION DESTINATION URL | http://xxx.yyy.zzz/tvapp.zip |
| COOPERATING DEVICE 1 | TV-100 |
| COOPERATING DEVICE 2 | TV-100,TABLET-10 |
| ROLE OF COOPERATING DEVICE 2 | DISPLAY DESTINATION |
| APPLICATION ID | recapp |
| SERVICE NAME | SET TO RECORD |
| SUMMARY | SET TO RECORD |
| VERSION | 2.1 |
| DISTRIBUTION DESTINATION URL | http://xxx.yyy.zzz/recapp.zip |
| COOPERATING DEVICE 1 | RECORDER-200 |
| APPLICATION ID | pictviewer |
| SERVICE NAME | PHOTOGRAPH DISPLAY |
| SUMMARY | VIEW PHOTOS |
| VERSION | 1.0 |
| DISTRIBUTION DESTINATION URL | http://xxx.yyy.zzz/pictviewer.zip |
| COOPERATING DEVICE 1 | DSC-001 |
| COOPERATING DEVICE 2 | TV-100,TABLET-10 |
| ROLE OF COOPERATING DEVICE 2 | DISPLAY DESTINATION |

FIG.9A

| APPLICATION ID | tvapp |
|---|---|
| SERVICE NAME | TELEVISION VIEWING |
| VERSION | 1.0 |
| APPLICATION ID | recapp |
| SERVICE NAME | SET TO RECORD |
| VERSION | 2.1 |
| APPLICATION ID | pictviewer |
| SERVICE NAME | PHOTOGRAPH DISPLAY |
| VERSION | 1.0 |

FIG.9B

| APPLICATION ID | tvapp |
|---|---|
| SERVICE NAME | TELEVISION VIEWING |
| VERSION | 2.0 |
| APPLICATION ID | recapp |
| SERVICE NAME | SET TO RECORD |
| VERSION | 2.1 |
| APPLICATION ID | pictviewer |
| SERVICE NAME | PHOTOGRAPH DISPLAY |
| VERSION | 1.0 |
| APPLICATION ID | picteditor |
| SERVICE NAME | PHOTOGRAPH EDITING |
| VERSION | 1.0 |

FIG.9C

| APPLICATION ID | tvapp |
|---|---|
| SERVICE NAME | TELEVISION VIEWING |
| VERSION | 2.0 |
| CONDITION | UPDATED |
| APPLICATION ID | recapp |
| SERVICE NAME | SET TO RECORD |
| VERSION | 2.1 |
| CONDITION | NO CHANGE |
| APPLICATION ID | pictviewer |
| SERVICE NAME | PHOTOGRAPH DISPLAY |
| VERSION | 1.0 |
| CONDITION | NO CHANGE |
| APPLICATION ID | picteditor |
| SERVICE NAME | PHOTOGRAPH EDITING |
| VERSION | 1.0 |
| CONDITION | NEW |

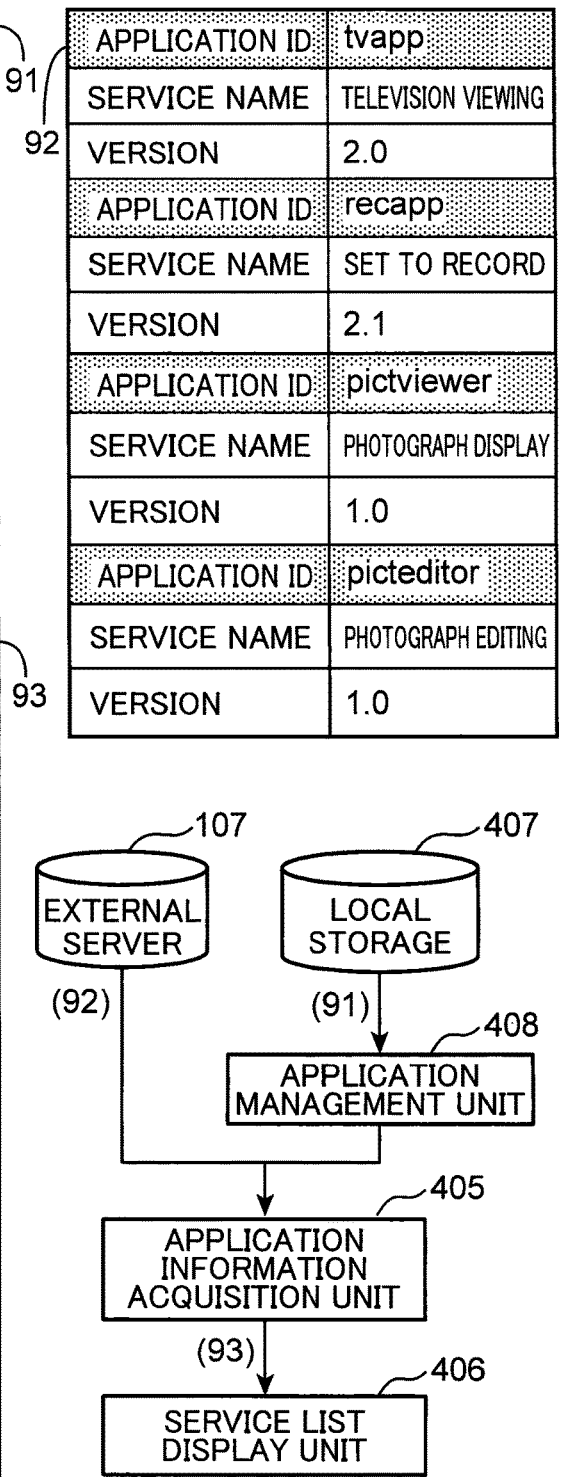

FIG.12
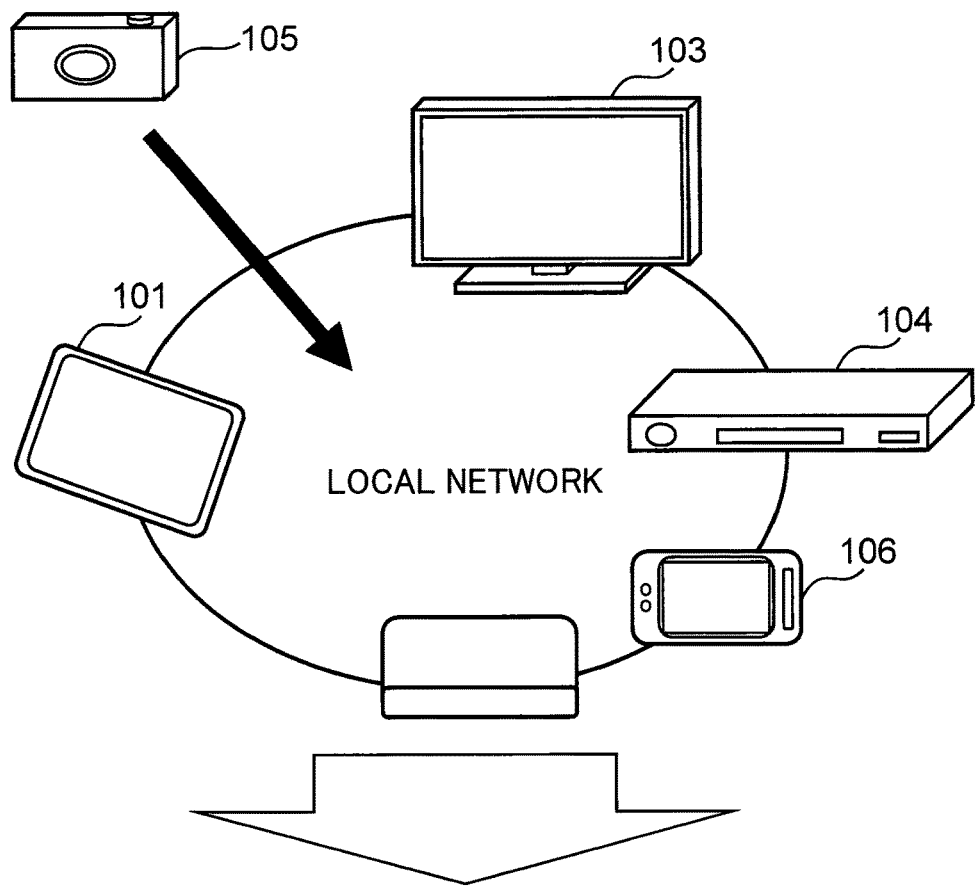
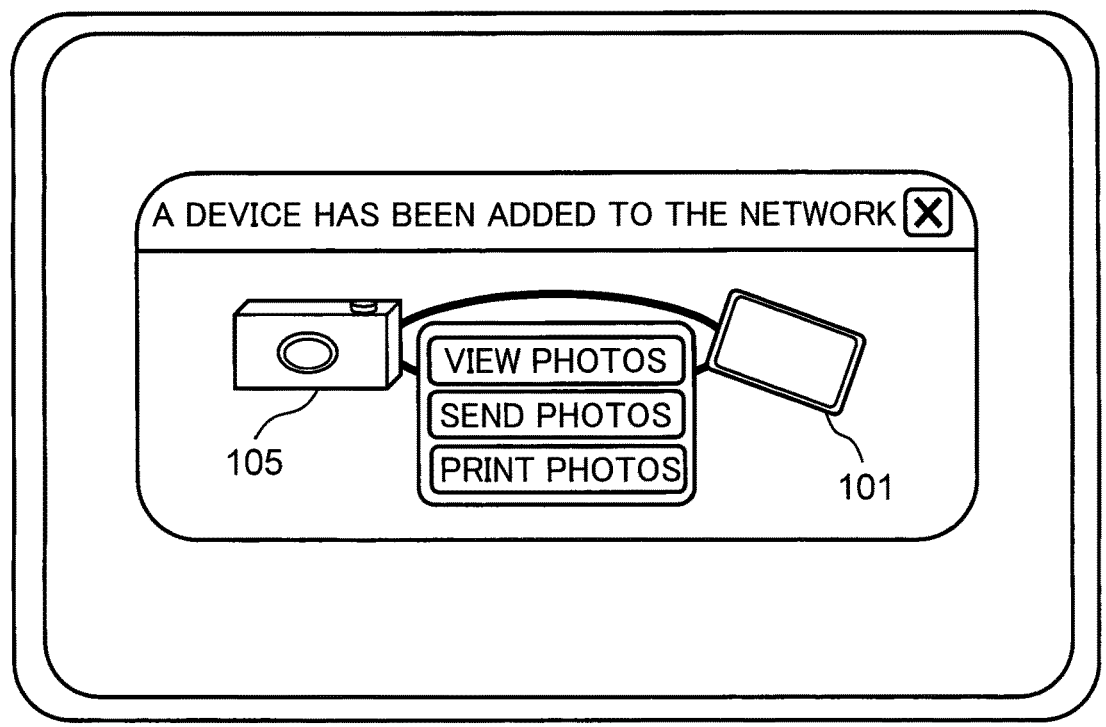

HOST DEVICE

GUEST DEVICE

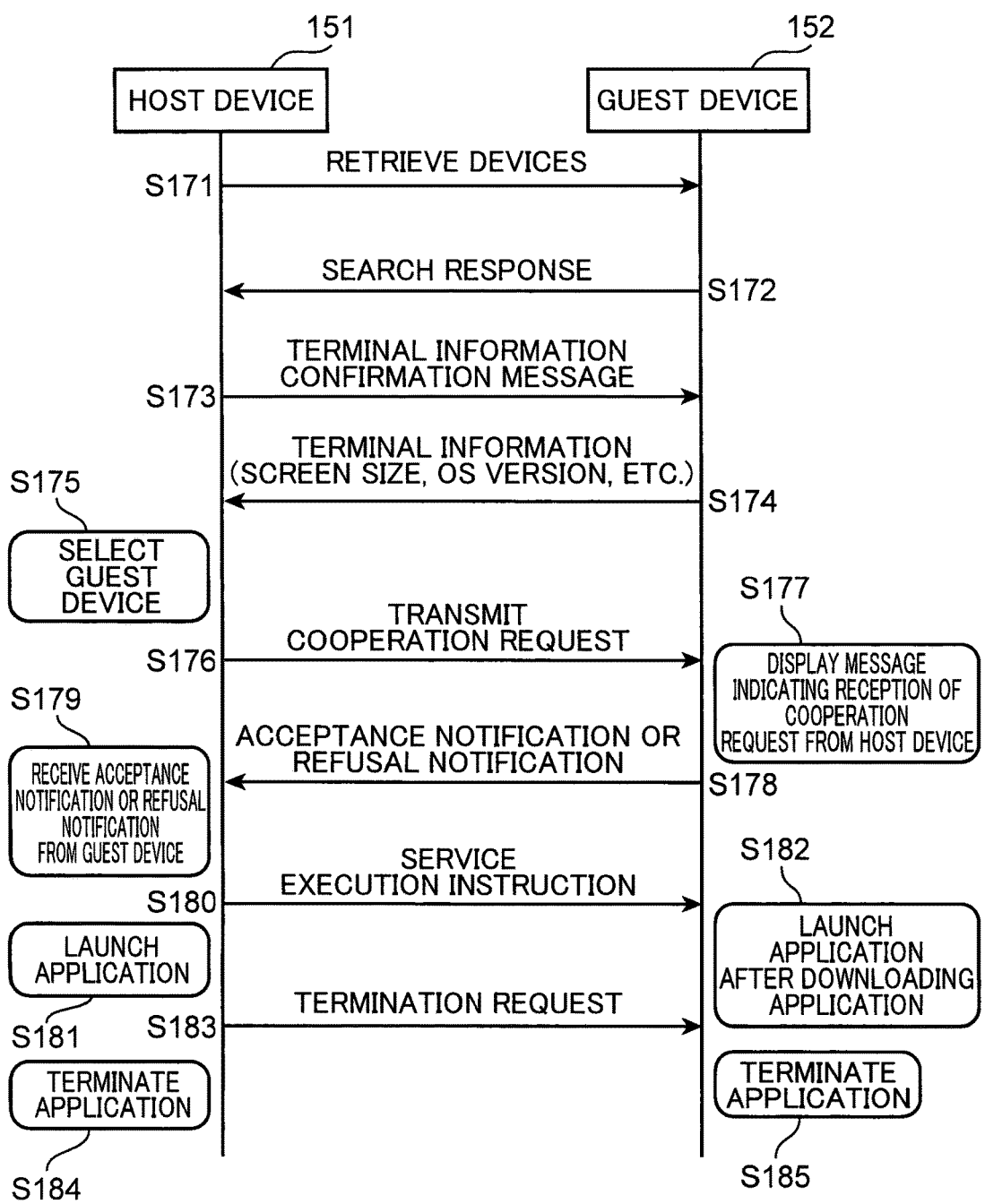

DEVICE COOPERATION SERVICE EXECUTION APPARATUS, DEVICE COOPERATION SERVICE EXECUTION METHOD, AND COMPUTER-READABLE RECORDING MEDIUM

TECHNICAL FIELD

The present invention relates to a device cooperation service technique for executing a device cooperation service in which devices connected via a network operate cooperatively while communicating with each other.

BACKGROUND ART

In a known device cooperation service in the related art, a device connected to a home network is retrieved using a communication protocol such as DLNA (Digital Living Network Alliance) or UPnP (Universal Plug and Play) for transmitting and receiving commands to and from devices connected to the home network, whereupon content is shared between the found device and a user device and the found device is operated remotely from the user device.

Further, in a known device cooperation service system (see Patent Document 1 and Patent Document 2, for example), when the cooperating devices are upgraded to a new standard, the device cooperation services are updated to correspond to the new standard by dynamically obtaining an application for realizing these device cooperation services from an external server.

However, although this conventional device cooperation service system can be applied to cooperation between devices currently connected to a home network, cooperation with a device that has been removed from the home network and is not therefore currently connected to the home network has not been taken into consideration.

Patent Document 1: WO 2005/066808
Patent Document 2: Japanese Patent Application Publication No. 2009-129198

SUMMARY OF THE INVENTION

An object of the present invention is to provide a technique capable of realizing device cooperation services while taking into account not only devices currently connected to a home network but also a device that is currently removed from the home network.

A device cooperation service execution apparatus according to an aspect of the present invention executes a device cooperation service while cooperating with a device connected to a local network, and includes: a device retrieval unit that retrieves devices connected to the local network; a device information management unit that records device information relating to the devices retrieved by the device retrieval unit in a local storage; an application information acquisition unit that obtains device cooperation service list information indicating device cooperation services that can be executed by an unconnected device, which is a device whose device information is recorded in the local storage but which was not retrieved by the device retrieval unit, and a connected device, which is a device retrieved by the device retrieval unit; a service list display unit that displays a list of the device cooperation services indicated by the device cooperation service list information and a list of the unconnected devices and the connected devices; and a service execution unit that executes a device cooperation service selected by a user from the list of device cooperation services displayed by the service list display unit by launching an application for executing the device cooperation service, wherein the device cooperation service list information includes device information of devices required to execute the respective device cooperation services, and the service list display unit determines on the basis of the device cooperation service list information and the device list of the unconnected devices and the connected devices whether or not the unconnected device is included in the devices required to execute the respective device cooperation services, and when the unconnected device is included, notifies the user that a device cooperation service requiring the unconnected device cannot be selected.

BRIEF DESCRIPTION OF THE DRAWINGS

FIG. 4 is a block diagram showing a functional configuration of the device cooperation service execution apparatus according to the first embodiment of the present invention.

FIG. 5 is a table showing an example of device information obtained as a search response.

FIG. 8 is a view showing an example of device cooperation service list information obtained from an external server.

FIGS. 9A to 9C are views showing examples of processing performed by an application information acquisition unit to extract a difference between the device cooperation service list information obtained from the external server and device cooperation service list information recorded in a local storage.

FIGS. 10A and 10B are screen views showing examples of list images created by a service list display unit, wherein FIG. 10A shows a local network configuration column and FIG. 10B shows a service configuration column.

FIG. 12 is a view showing an example of a notification screen displayed when an owned device removed from a local network is reconnected to the local network, wherein an upper image is a local network display column and a lower image is a column displaying device cooperation services possessed by the owned device reconnected to the local network.

FIGS. 17A and 17B are views showing examples of screens displayed on a host device and a guest device when a device cooperation service is started outside the home, wherein FIG. 17A shows a screen displayed on the host device and FIG. 17B shows a screen displayed on the guest device.

FIG. 18 is a sequence diagram showing data content exchanged between the host device and the guest device before the device cooperation service is started.

DESCRIPTION OF INVENTION

Figure 1:
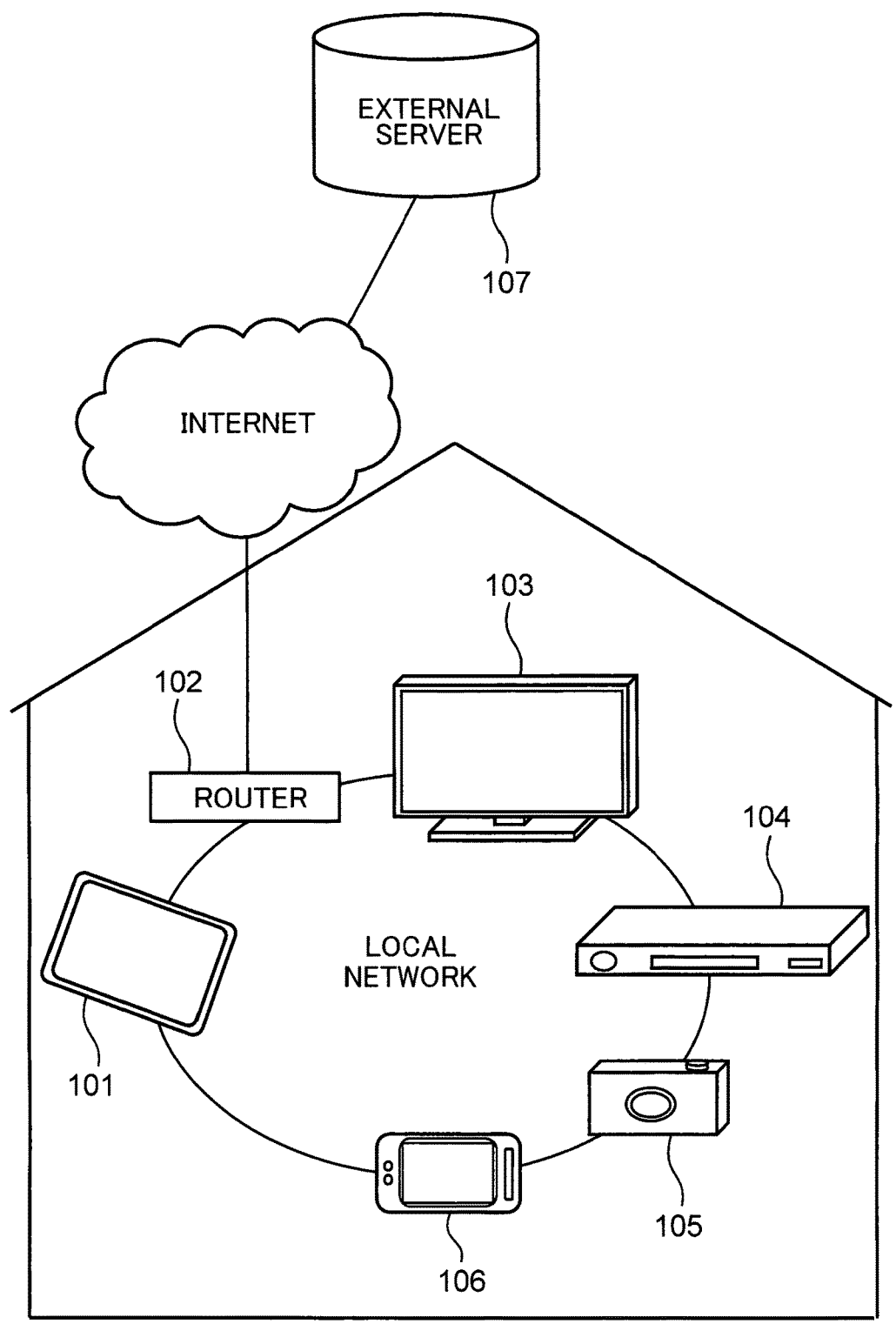
FIG. 1 is a view showing an example of use of a device cooperation service execution apparatus according to a first embodiment of the present invention.

Development of Device Cooperation Service Execution Apparatus According to this Embodiment Devices owned by a user are not always connected to a home network, and a device may be removed from the home network by switching a power supply of the device OFF, taking the device outside the home, and so on.

In a conventional device cooperation service system, however, only devices currently connected to the home network are taken into account, and therefore the device cooperation service system can only provide device cooperation services when a device continuously possesses an IP address.

It is also possible to envisage a device that is currently connected to the home network but will be disconnected from the home network in the future. However, a conventional device cooperation service system takes into account only devices currently connected to the home network and cannot therefore be applied to all of the devices owned by the user, including those not currently connected to the home network. Hence, the system is incomplete.

Furthermore, when a device is purchased, the user may stop using the device due to a lack of interesting published services, disconnect the device from the home network, and store the device in the back of a cupboard, for example. Thereafter, however, an extremely attractive device cooperation service may be published for the device.

With a conventional device cooperation service system, however, the user can only find out about available device cooperation services by connecting the device to the network. Hence, with this conventional device cooperation service system, when an attractive device cooperation service is subsequently published for a device that has been disconnected from the home network, means for informing the user of the device cooperation service does not exist, and therefore the device may remain stored in the cupboard.

Moreover, the user may not own all of the devices connected to the home network. For example, when a device incorporated into the device cooperation service system is taken outside the home and connected to a public wireless LAN service, a device cooperation service may be conducted between this device and another person's device connected to the public wireless LAN service. In this case, if the device cooperation service is conducted between the devices without any restrictions, personal information may be stolen by the other person's device unknowingly, or the host device may perform an unintended operation.

Furthermore, when a friend visits the home of the user and connects his/her device temporarily to the home network such that a device cooperation service is executed without restrictions between the user device and the friend's device, unexpected operations, such as automatic updating of applications and overwriting of settings on the user device, may be performed even though the network participation is temporary.

Hence, the device cooperation service execution apparatus according to this embodiment provides a technique for realizing device cooperation services while taking into account not only the devices currently connected to the home network but also devices that are currently removed from the home network.

First Embodiment

FIG. 1 is a view showing an example of use of a device cooperation service execution apparatus 101 according to a first embodiment of the present invention. The device cooperation service execution apparatus 101 is connected to the Internet and a local network via a router 102. The device cooperation service execution apparatus 101 is capable of accessing an external server 107 via the Internet, and devices connected to the local network, which is constructed in a home, via the local network.

Here, the Internet serves as an example of an external network. The external network is not limited to the Internet, and any network capable of data communication, such as a leased line network or a public line network, for example, may be employed instead.

The local network is constructed using one or both of a wired LAN and a wireless LAN, for example, and is used to transfer data in accordance with a communication protocol such as DLNA (Digital Living Network Alliance) or UPnP (Universal Plug and Play).

Network-compatible devices such as a television 103, a BD (Blu-ray Disc) recorder 104, a digital camera 105, and a portable player 106 may be cited as examples of devices connected to the local network in addition the device cooperation service execution apparatus 101. These devices are connected to the same router 102 so as to be capable of transmitting and receiving data to and from each other via the local network.

The device cooperation service execution apparatus 101 detects the devices connected to the local network, and transmits a device list including model numbers and so on of the detected devices to the external server 107 via the Internet. Having received the device list, the external server 107 transmits device cooperation service list information indicating device cooperation services that can be executed by the group of devices to the device cooperation service execution apparatus 101. Here, the device cooperation service list information includes device information required to execute the device cooperation services, and distribution destination URLs of applications required to execute the device cooperation services. When, during execution of a device cooperation service, a corresponding application is not present, the device cooperation service execution apparatus 101 can access the distribution destination URL and download the corresponding application.

The device cooperation service execution apparatus 101 displays to a user a list of the device cooperation services included in the device cooperation service list information received from the external server 107, thereby prompting the user to select a device cooperation service that can be executed by the group of devices currently connected to the local network. The device cooperation service execution apparatus 101 then executes the selected device cooperation service cooperatively with a cooperation destination device.

Note that in this embodiment, the device cooperation service execution apparatus 101 will be described hereafter as a tablet terminal, but any portable terminal having a similar configuration, such as a smartphone or a portable AV player, may be employed. A stationary device such as a BD recorder into which the functions of the device cooperation service execution apparatus 101 are incorporated may also be employed as the device cooperation service execution apparatus 101.

Figure 2A:
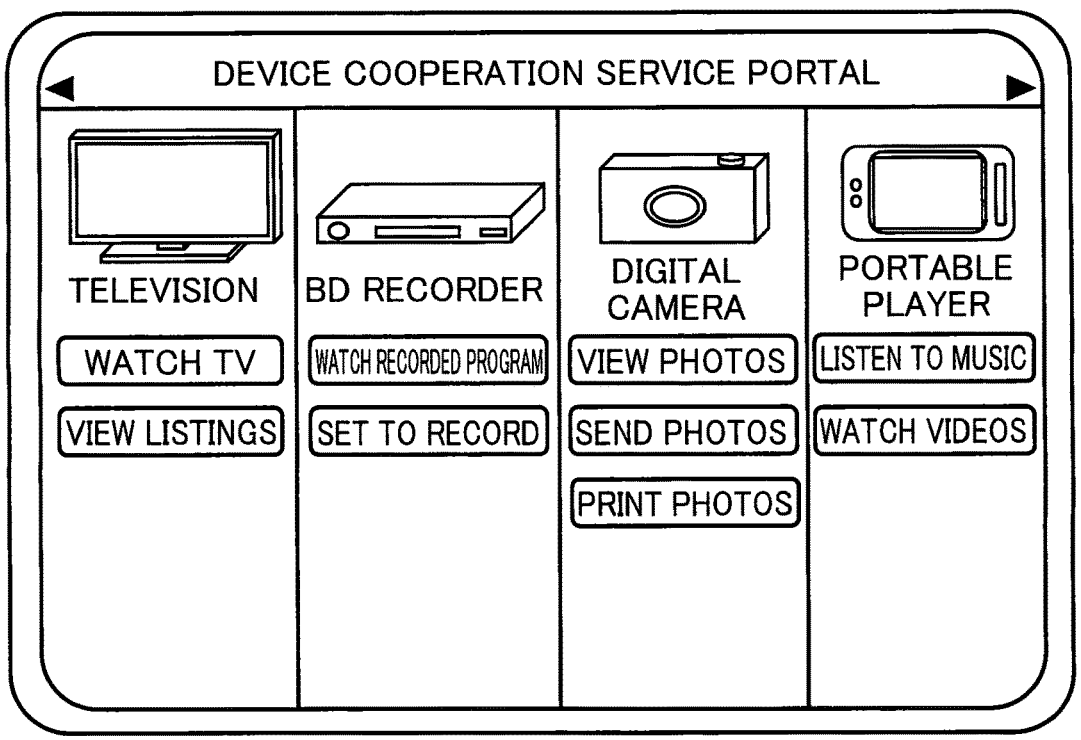
FIGS. 2A and 2B are views showing examples of device cooperation services displayed in a list by the device cooperation service execution apparatus.
Figure 2B:
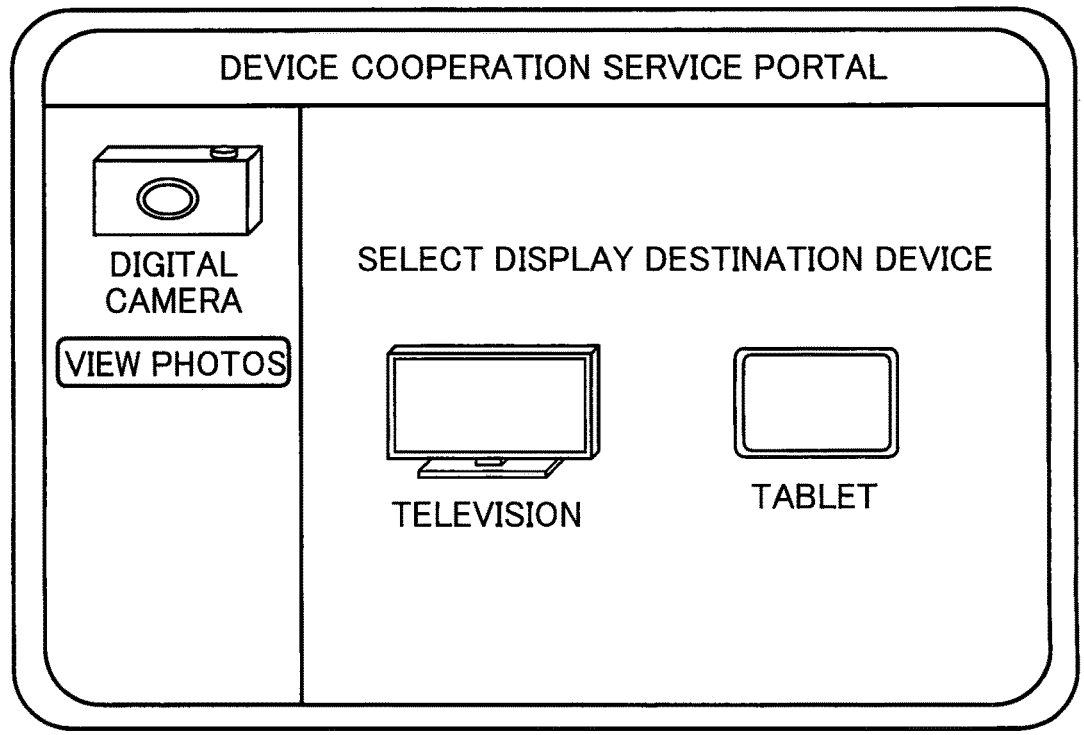

FIGS. 2A and 2B are views showing examples of the device cooperation services displayed in a list by the device cooperation service execution apparatus 101. FIG. 2A is a view showing an example of a service selection screen, and FIG. 2B is a view showing an example of a device selection screen. The device cooperation service execution apparatus 101 displays a list of the device cooperation services indicated by the device cooperation service list information obtained from the external server 107 on a screen in association with the cooperation destination devices, as shown in FIG. 2A, for example. If the list of device cooperation services is shown alone, it may be impossible to determine which device cooperation services are realized cooperatively with which devices, and as a result, the user may operate the wrong device unintentionally.

Therefore, as shown in FIG. 2A, the device cooperation service execution apparatus 101 displays a list image on which each device cooperation service is associated with the device used to realize the device cooperation service. Thus, the user can intuitively understand which devices are to be used to execute which device cooperation services.

Further, by displaying a list of the devices used for the respective device cooperation services rather than simply displaying a list of device cooperation services, the user can see all of his/her owned devices at a glance, and as a result, the user can be provided with a sense of ownership of the devices.

In the examples shown in FIGS. 2A and 2B, the television 103, the BD recorder 104, the digital camera 105, the portable player 106, and the device cooperation service execution apparatus 101 constituted by a tablet terminal are connected to the local network.

At this time, "TV", "BD Recorder", "Digital Camera", and "Portable Player" icons are displayed as examples of the devices used for the device cooperation services together with icons of the services provided by the respective devices (for example, "Watch TV" and "View Listings" are displayed under the "TV" icon as functions of the television 103, "Watch a Recorded Program" and "Set to Record" are displayed under the "BD Recorder" icon, and so on).

Further, a selection can be input in relation to the services provided by the respective devices from an input unit (not shown). In a case where the device cooperation service execution apparatus 101 is a tablet terminal, the information shown in FIG. 2A is displayed on a touch panel, and by pressing the touch panel in or near a display position of the icon corresponding to a certain service provided by a device, a selection can be input in relation to that service from the touch panel.

Note that in the examples shown in FIGS. 2A and 2B, the device cooperation service execution apparatus 101 is a tablet terminal, and therefore the tablet terminal itself is not shown in FIG. 2A.

To set the BD recorder 104 connected to the local network to record a program from the device cooperation service execution apparatus 101, which is constituted by a tablet terminal and operated by the user by hand, the user selects "Set to Record" by touching the "Set to Record" icon in the "BD Recorder" column of FIG. 2A. As a result, a set-to-record service is executed between the device cooperation service execution apparatus 101 and the remote BD recorder 104.

When the device cooperation service selected by the user is a two-device cooperation service that can be executed through cooperation between two devices connected to the local network, the user selects the device cooperation service from the column of the device to be operated in FIG. 2A, whereupon the two-device cooperation service is executed by two devices, i.e. the device to be operated and the device cooperation service execution apparatus 101.

When the device cooperation service selected by the user is a three-device cooperation service that is executed through cooperation between three devices connected to the network, on the other hand, first, the user selects the device cooperation service from the column of the device to be operated in FIG. 2A. Accordingly, the device selection screen shown in FIG. 2B is displayed. The user then selects another cooperation destination device on the device selection screen. As a result, the three-device cooperation service is executed by three devices, i.e. the device cooperation service execution apparatus 101, the device selected from FIG. 2A, and the device selected from FIG. 2B.

For example, the device cooperation service displayed as "View Photos" in the column of the digital camera shown in FIG. 2A is a three-device cooperation service performed by a display destination device in addition to the device cooperation service execution apparatus 101 and the digital camera.

In this case, the user selects "View Photos" from the column of the digital camera in FIG. 2A, and then selects the display destination device in FIG. 2B. In the example shown in FIG. 2B, "TV" and "Tablet" may be selected as the display destination device. Here, by selecting "TV", the user can operate the digital camera 105 from the device cooperation service execution apparatus 101 via the local network such that a photograph taken using the digital camera 105 is displayed on the television 103. By selecting "Tablet", on the other hand, the user can operate the digital camera 105 from the device cooperation service execution apparatus 101 such that a two-device cooperation service for displaying a photograph taken by the digital camera 105 on the device cooperation service execution apparatus 101 is executed.

Further, the device cooperation service displayed as "Send Photos" in FIG. 2A is a three-device cooperation service performed by a transfer destination device in addition to the device cooperation service execution apparatus 101 and the digital camera.

In this case, the user selects "Send Photos" in FIG. 2A, and then selects the transfer destination device in FIG. 2B. Similarly to "Send Photos", "Print Photos" in FIG. 2A is also a three-device cooperation service. In this case, the user selects a printing destination device in FIG. 2B.

The screen for selecting the display destination, shown in FIG. 2B, is also displayed when the user selects "Watch TV" from the column of the television in FIG. 2A. By selecting "TV", the user can operate the television 103 from the device cooperation service execution apparatus 101 such that images from the television 103 are displayed on the television 103. By selecting "Tablet", on the other hand, the user can operate the television 103 using the device cooperation service execution apparatus 101 such that images from the television 103 are displayed on the device cooperation service execution apparatus 101.

Note that when the cooperation destination device has been set in advance by the user, the device cooperation service may be executed with the preset cooperation destination device following selection of the device cooperation service. In this case, the user does not have to perform an operation to select a device every time a device cooperation service is selected.

Figure 3A:
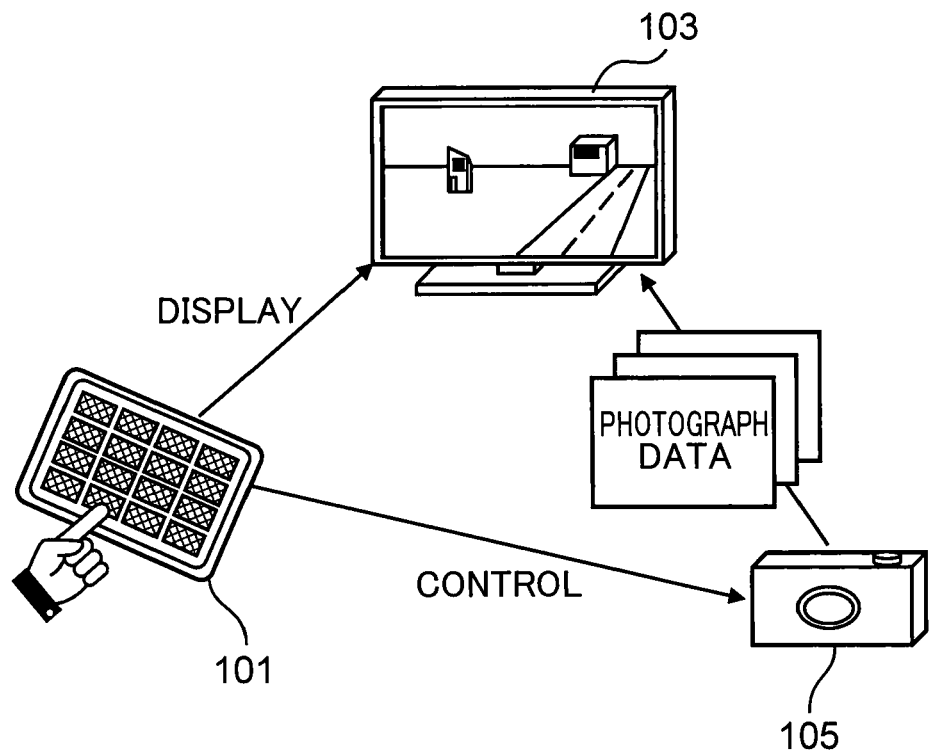
FIGS. 3A and 3B are views showing examples of a two-device cooperation service and a three-device cooperation service.
Figure 3B:
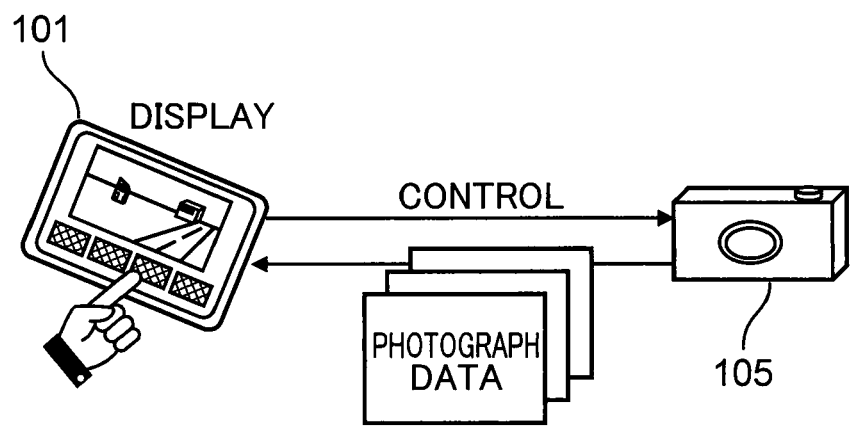

FIGS. 3A and 3B are views showing examples of a two-device cooperation service and a three-device cooperation service. FIG. 3A shows an example of the three-device cooperation service executed when "TV" is selected as the display destination device in FIG. 2B, as described above.

When the display destination device is the television 103, a list of thumbnail images of photographs stored in the digital camera 105 is displayed on the device cooperation service execution apparatus 101, whereupon the user selects a photograph to be displayed on the television 103 from the displayed list of thumbnail images. The digital camera 105 then transfers the photograph selected on the device cooperation service execution apparatus 101 to the television 103, whereupon the television 103 displays the photograph transferred from the digital camera 105 on the screen. During execution of this three-device cooperation service, the device cooperation service execution apparatus 101 serves as an operation device, the television 103 serves as a display device, and the digital camera 105 serves as a content provision device.

When the user selects "Tablet" as the display destination device in FIG. 2B, on the other hand, the two-device cooperation service shown in FIG. 3B is executed. In this case, when a photograph stored in the digital camera 105 is selected, the device cooperation service execution apparatus 101 displays the selected photograph. Hence, during execution of this two-device cooperation service, the device cooperation service execution apparatus 101 serves as both the operation device and the display device, while the digital camera 105 serves as the content provision device.

FIG. 4 is a block diagram showing an example of a functional configuration of the device cooperation service execution apparatus 101 according to the first embodiment of the present invention. As shown in FIG. 4, the device cooperation service execution apparatus 101 includes a network interface (network I/F) 401, a device retrieval unit 402, an owned device determination unit 403, an owned device management unit 404 (serving as an example of a device information management unit), an application information acquisition unit 405, a service list display unit 406, a local storage 407, an application management unit 408 (serving as an example of an application information management unit), a service execution unit 409, and a display unit 410.

The network interface 401 is constituted by a communication apparatus and a computer-readable program for controlling the communication apparatus, and is realized by having a CPU execute the program. The display unit 410 is constituted by a display apparatus such as a liquid crystal display or an organic EL display. The device retrieval unit 402, the owned device determination unit 403, the owned device management unit 404, the application information acquisition unit 405, the service list display unit 406, the application management unit 408, and the service execution unit 409 are constituted by a computer-readable program and realized by having a CPU execute the program. The local storage 407 is constituted by a recording medium such as a hard disk drive. Note that the computer-readable program for realizing the respective blocks shown in FIG. 4 is stored in a hard disk drive, a rewritable memory, a Read-Only Memory, or the like as a device cooperation service execution program, and is executed by the CPU when loaded to the CPU. In the example shown in FIG. 4, the respective blocks are realized by having the CPU execute the device cooperation service execution program, but may be realized by a dedicated hardware circuit. In this case, the device cooperation service execution apparatus 101 may be realized by an integrated circuit in which the respective blocks shown in FIG. 4 are constituted by a single chip. When the device cooperation service execution apparatus 101 is constituted by an integrated circuit, either the device retrieval unit 402 to the service list display unit 406, the application management unit 408, and the service execution unit 409 may be constituted by a single chip, or all blocks other than the display unit 410 may be constituted by a single chip, for example.

The network interface 401 is a communication interface for connecting the device cooperation service execution apparatus 101 to the local network and the Internet. The device cooperation service execution apparatus 101 accesses the group of devices on the local network and the external server 107 on the Internet via the network interface 401.

The device retrieval unit 402 retrieves devices connected to the same local network. Here, the device retrieval unit 402 retrieves the devices using a device retrieval protocol such as SSDP (Simple Service Discovery Protocol) in UPnP (Universal Plug and Play), for example.

More specifically, the device retrieval unit 402 transmits a search message to the local network via the network interface 401 by multicast. A device that receives the search message returns device information relating to itself to the device that transmitted the search message as a search response.

The device information obtained as the search response includes, for example, a device name, a manufacturer name, a model number, a device IP address, a device ID, an icon URL, and so on. A name that can be set freely by the user in relation to the device, for example, is employed as the device name. For example, the name "Living Room TV" is set.

The name of the manufacturer of the device, for example, is employed as the manufacturer name. By using the name of the manufacturer of the device, the group of devices can be narrowed so that cooperation services are performed by a group of devices manufactured by a specific manufacturer, for example.

The model number of the device, for example, is employed as the model number. Identical model numbers are allocated to devices having identical functions. An IP address allocated to the device when the device is connected to the local network, for example, is employed as the device IP address.

A device ID allocated uniquely to each device, for example, is employed as the device ID. Different device IDs are allocated to devices having an identical model number.

A URL specifying a storage location of icon data representing the device, for example, is employed as the icon URL. When a list of retrieved devices is displayed by the device cooperation service execution apparatus 101, the icon data may be obtained from the icon URL so that instead of displaying only the device names, the icons are displayed together with the device names. In so doing, the retrieved devices can be presented to the user in an easily understood manner.

FIG. 5 is a table showing an example of the device information obtained as the search response. As shown in FIG. 5, by acquiring the search response, the device retrieval unit 402 can obtain the device name, device ID, model number, manufacturer name, device IP address, and icon URL of each device connected to the local network. In the example shown in FIG. 5, device information relating to the television, the BD recorder, the digital camera, and the portable player is obtained as the search response.

Returning to FIG. 4, the owned device determination unit 403 determines which of the devices retrieved by the device retrieval unit 402, or in other words which of the devices that returned the search response, is a device owned by the user (to be referred to hereafter as an "owned device").

Here, the owned device determination unit 403 determines retrieved devices that match a condition set in advance by the user to be owned devices, and determines devices that do not match the condition to be non-owned devices. Note that the preset condition will be described below.

The owned device management unit 404 records the device information of the devices determined to be owned devices by the owned device determination unit 403 in the local storage 407, and manages the device information of the owned devices. The owned device management unit 404 also records the device information of a newly retrieved owned device in the local storage 407 and reads the recorded device information of the owned devices from the local storage 407.

The application information acquisition unit 405 transmits a device list including unconnected devices, which are owned devices whose device information is recorded in the local storage 407 but which were not retrieved by the device retrieval unit 402, and connected devices, which are the owned devices retrieved by the device retrieval unit 402, to the external server 107 via the external network. Further, the application information acquisition unit 405 obtains device cooperation service list information indicating the device cooperation services that can be executed by the unconnected devices and the connected devices.

In other words, the application information acquisition unit 405 obtains a list of device cooperation services that can be realized using not only the devices currently connected to the local network but also devices that were connected to the local network in the past but are currently removed from the local network.

The service list display unit 406 displays a list of the device cooperation services indicated by the device cooperation service list information obtained by the application information acquisition unit 405 from the external server 107 and the devices determined to be owned devices by the owned device management unit 404 on the display unit 410 in order to prompt the user to select a device cooperation service. In this case, the service list display unit 406 generates a list image in which the owned devices and the device cooperation services that can be executed by the respective owned devices are displayed in a list, as shown in FIG. 2A, and writes corresponding screen data to a frame buffer so that the list image is displayed on the display unit 410.

Here, the service list display unit 406 determines, on the basis of the device cooperation service list information and the device list transmitted to the external server 107 whether or not an unconnected device is included as a device required to execute the respective applications. When an unconnected device is included, the service list display unit 406 notifies the user that the applications requiring the unconnected device cannot be selected. In this case, the service list display unit 406 displays a list image such as that shown in FIG. 10 or FIG. 11, for example.

The application management unit 408 records the device cooperation service list information obtained by the application information acquisition unit 405 from the external server 107 in the local storage 407. Here, when an application corresponding to the device cooperation service selected by the user is not yet installed, the application management unit 408 installs the corresponding application in the local storage 407 on the basis of the device cooperation service list information.

The local storage 407 is a recording medium attached to the device cooperation service execution apparatus 101, such as a hard disk drive (HDD), a USB memory, an SD memory card, or an inbuilt flash memory.

More specifically, the device information of the devices determined to be owned devices by the owned device determination unit 403, the device cooperation service list information recorded by the application management unit 408, applications installed by the application management unit 408, and so on are recorded in the local storage 407.

The service execution unit 409 executes a device cooperation service by launching the application for executing the device cooperation service selected by the user from the list of device cooperation services displayed on the display unit 410 by the service list display unit 406. Here, during execution of the device cooperation service, the service execution unit 409 transmits and receives data to and from the coordination destination device via the network interface 401 so that the device cooperation service is executed cooperatively with the cooperation destination device.

Further, when the application corresponding to the device cooperation service selected by the user is not yet installed, the service execution unit 409 issues an installation instruction to the application management unit 408. When the application management unit 408 finishes installing the uninstalled application, the service execution unit 409 launches the application in order to start the device cooperation service.

The display unit 410 is constituted by a display apparatus including a touch panel, for example, and is used to display various images, such as list images, and receive instructions input by the user.

Note that the display unit 410 may be a display apparatus configured not to include a touch panel. In this case, the display apparatus configured not to have a touch panel preferably includes an input unit (a remote control, an input button, or the like), not shown in the drawings, so that instructions input by the user are received by the input unit.

The functional configuration of the device cooperation service execution apparatus 101 is as described above.

A database in which a plurality of device cooperation services provided to be user are associated with the device information of the devices required to execute the respective device cooperation services is stored in the external server 107 in advance. The external server 107, having received the device list of unconnected devices and connected devices from the application information acquisition unit 405, refers to the database to extract the device cooperation services that can be executed using the devices on the device list, and returns the device cooperation service list information showing a list of the extracted device cooperation services.

Figure 6:
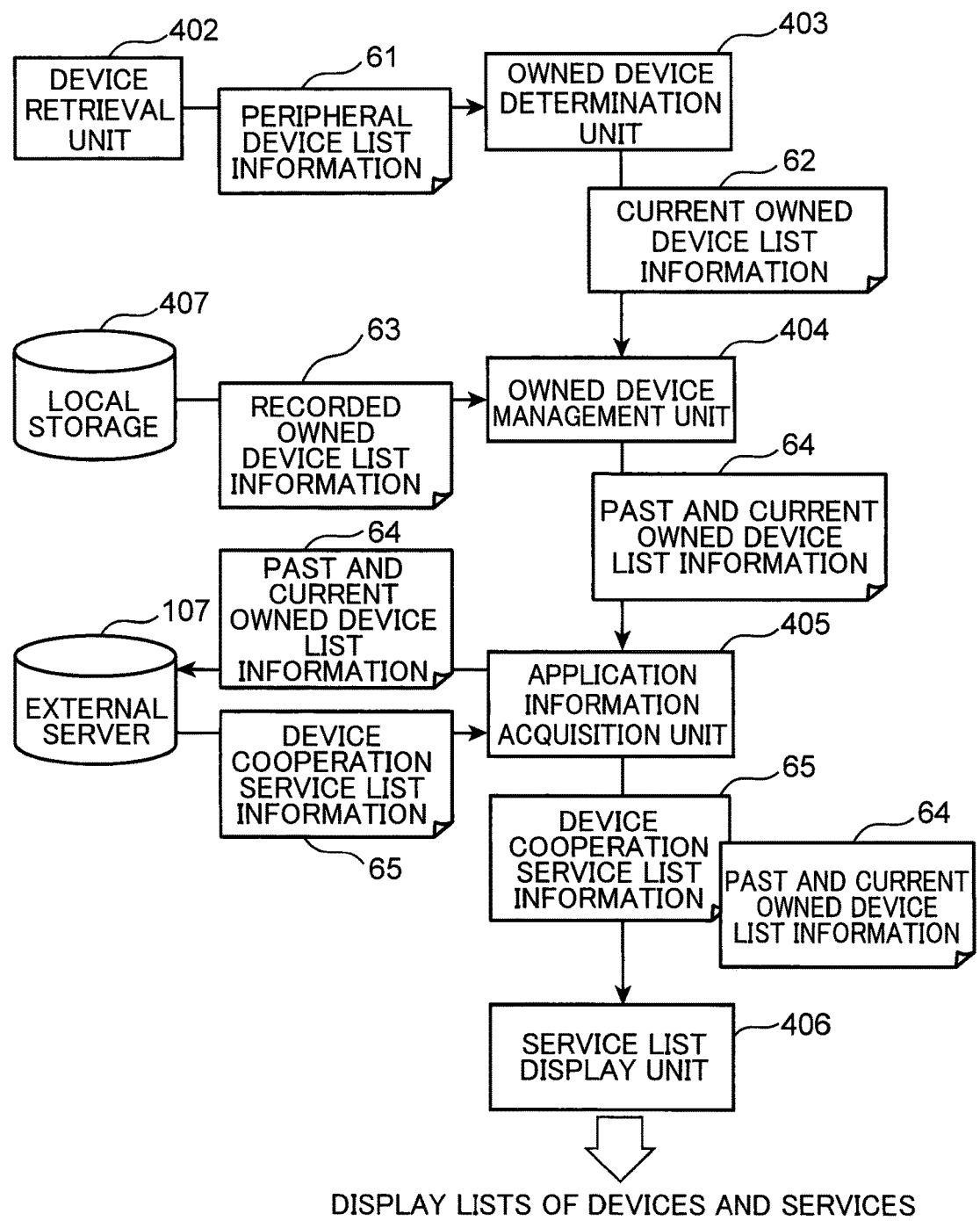
FIG. 6 is a view showing data exchange between the respective blocks shown in FIG. 4.

FIG. 6 is a view showing data exchange between the respective blocks shown in FIG. 4. Peripheral device list information 61, which is a list of devices located on the periphery of the device cooperation service execution apparatus 101 and retrieved by the device retrieval unit 402, is passed to the owned device determination unit 403.

The owned device determination unit 403 extracts the owned devices currently connected to the local network by determining whether or not the devices indicated by the peripheral device list information 61 match a condition specified in advance, and creates current device list information 62, which is a list of the device information of the extracted devices. The current device list information 62 is passed to the owned device management unit 404.

The owned device management unit 404 handles the current owned device list information 62 received from the owned device determination unit 403 as a list of current owned devices, and handles owned device list information (recorded owned device list information 63) recorded in the local storage 407 as a list of past owned devices. In other words, the recorded owned device list information 63 indicates devices determined to be owned devices in past retrieval operations.

The owned device management unit 404 creates past and current owned device list information 64 by merging the current owned device list information 62 and the recorded owned device list information 63, and passes the past and current owned device list information 64 to the application information acquisition unit 405.

Here, the owned device management unit 404 creates the past and current owned device list information 64 by adding the device information of the devices included in the current owned device list information 62 but not included in the recorded owned device list information 63 to the recorded owned device list information 63. In other words, the past and current owned device list information 64 is a device list including connected devices corresponding to the devices currently connected to the local network and unconnected devices corresponding to devices that were connected to the local network in the past but are not currently connected to the local network.

The application information acquisition unit 405 transmits the past and current owned device list information 64 received from the owned device management unit 404 to the external server 107. The external server 107 extracts the device cooperation services that can be executed by the group of devices entered in the past and current owned device list information 64, and returns device cooperation service list information 65 indicating the extracted device cooperation services to the application information acquisition unit 405. The application information acquisition unit 405, having received the device cooperation service list information 65 from the external server 107, passes the device cooperation service list information 65 and the past and current owned device list information 64 to the service list display unit 406.

The service list display unit 406 displays a list of past and current owned devices and the device cooperation services that can be executed by the respective owned devices on the display unit 410 on the basis of the received device cooperation service list information 65 and past and current owned device list information 64.

Figure 7:
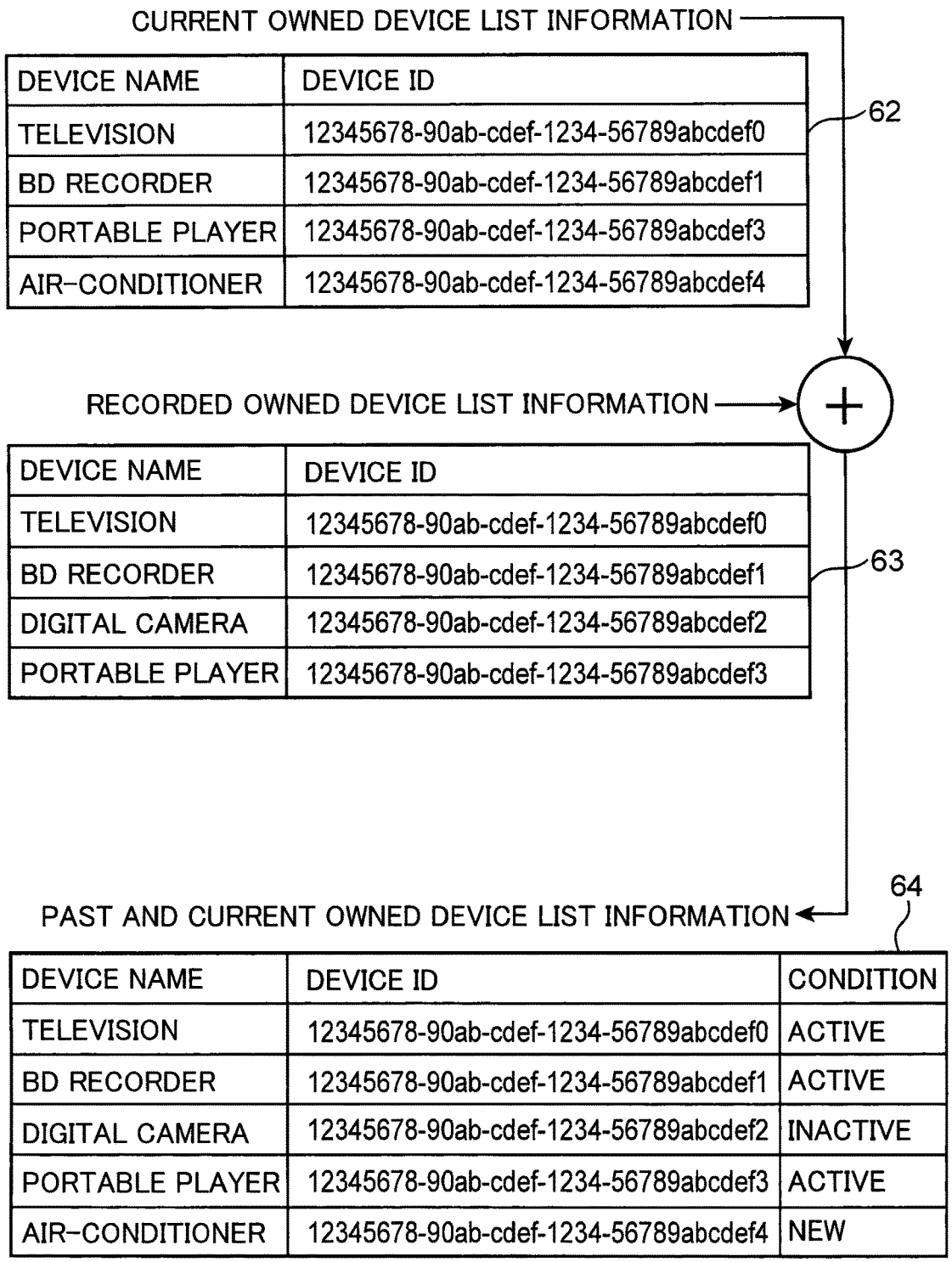
FIG. 7 is a view showing an example of processing performed by an owned device management unit to merge current owned device list information with recorded owned device list information.

FIG. 7 is a view showing an example of processing performed by the owned device management unit 404 to merge the current owned device list information 62 with the recorded owned device list information 63. It is assumed, for example, that the current owned device list information 62 includes a television, a BD recorder, a portable player, and an air-conditioner, while the recorded owned device list information 63 includes the television, the BD recorder, a digital camera, and the portable player.

The owned device management unit 404 determines the difference between the current owned device list information 62 and the recorded owned device list information 63 from the device IDs and, considering a device that exists in the current owned device list information 62 but does not exist in the recorded owned device list information 63 as a newly added device, creates the past and current owned device list information 64 by adding the newly added device to the recorded owned device list information 63.

In this case, the owned device management unit 404 enters a value indicating newness in a condition column of the past and current owned device list information 64. In the example of FIG. 7, the device ID corresponding to the air-conditioner exists in the current owned device list information 62 but not in the recorded owned device list information 63, and therefore "New" is entered into the condition column of the air-conditioner in the past and current owned device list information 64.

Meanwhile, the owned device management unit 404 considers a device that does not exist in the current owned device list information 62 but does exist in the recorded owned device list information 63 as an unconnected device that is not connected to the network and therefore cannot currently be used in a device cooperation service, and enters a value indicating inactivity into the condition column of the past and current owned device list information 64. In the example of FIG. 7, the device ID corresponding to the digital camera exists in the recorded owned device list information 63 but not in the current owned device list information 62, and therefore "Inactive" is entered into the "Condition" column of the digital camera in the past and current owned device list information 64.

The owned device management unit 404 determines that a device existing in both the current owned device list information 62 and the recorded owned device list information 63 has been connected to the local network continuously without a change in condition, and therefore enters a value indicating activity in the past and current owned device list information 64 as the condition of the device. In the example of FIG. 7, the television, the BD recorder, and the portable player exist in both the current owned device list information 62 and the recorded owned device list information 63, and therefore "Active" is entered in the respective "Condition" columns of these devices in the past and current owned device list information 64. Note that in FIG. 7, a device having "Active" or "New" in the condition column is a connected device, whereas a device having "Inactive" is an unconnected device.

FIG. 8 is a view showing an example of the device cooperation service list information obtained from the external server 107. The device cooperation service list information has a data structure whereby a single table 81 is allocated to each device cooperation service. The table 81 includes information such as an "Application ID", a "Service Name", a "Summary", a "Version", a "Distribution Destination URL", and a "Cooperating Device 1".

The "Application ID" is an identifier allocated uniquely to each device cooperation service. The "Service Name" is a title attached to each device cooperation service. The "Summary" is information briefly describing the service content. The "Version" indicates a version of the application corresponding to each device cooperation service. When the application constituting the device cooperation service is updated and the updated version of the application is published, for example, a version number of the updated version of the application is entered as the "Version".

The "Distribution Destination URL" is the URL of the distribution destination of the application required to execute the device cooperation service. When an application corresponding to a device cooperation service to be executed has not yet been installed, the application is downloaded from the URL indicated by the distribution destination URL, and once installation is complete, the service can be executed.

The "Cooperating Device 1" is the model number of the device that serves as a cooperation subject when the device cooperation service is executed. For example, to execute the "Watch TV" device cooperation service, a device having a model number TV-100 is required, and therefore "TV-100" is entered as the "Cooperating Device 1" on the table 81 for "Watch TV".

A "Cooperating Device 2" indicates a device used when the device cooperation service corresponds to a three-device cooperation service. When a plurality of model numbers are entered as the "Cooperating Device 2", this means that a plurality of candidates exist as cooperation subject devices. For example, "TV-100, TABLET-10" is entered as the "Cooperating Device 2" of a "Display Photos" device cooperation service. Therefore, either a device having the model number "TV-100" or a device having the model number "TABLET-10" can be selected as the display destination device of this device cooperation service.

A "Role of Cooperating Device 2" indicates a purpose of the device entered as the "Cooperating Device 2". For example, "Display Destination" is entered as the "Role of Cooperating Device 2" of the "Display Photos" device cooperation service. It can therefore be understood that the devices having "TV-100" and "TABLET-10" entered in the "Cooperating Device 2" are used to display photographs.

Note that in the case of a four-device cooperation service, a "Cooperating Device 3" and a "Role of Cooperating Device 3" are added. Further, a "Cooperating Device 0" refers implicitly to the device cooperation service execution apparatus 101 serving as a service launching source device. For example, in a case where the device cooperation service execution apparatus 101 is a tablet terminal (model number: TABLET-10), and the user launches the photograph display service from the tablet terminal and selects the television (model number: TV-100) as the display destination, a three-device cooperation service in which Cooperating Device 0=TABLET-10, Cooperating Device 1=DSC-001, and Cooperating Device 2=TV-100 is executed.

FIGS. 9A to 9C are views showing examples of processing performed by the application information acquisition unit 405 to extract the difference between the device cooperation service list information obtained from the external server 107 and the device cooperation service list information recorded in the local storage 407.

First, the application information acquisition unit 405 obtains server side device cooperation service list information 92 from the external server 107. Next, the application information acquisition unit 405 asks the application management unit 408 whether or not local side device cooperation service list information 91 already recorded in the local storage 407 exists. When the local side device cooperation service list information 91 exists, the application information acquisition unit 405 extracts a difference between the server side device cooperation service list information 92 and the local side device cooperation service list information 91 and creates updated device cooperation service list information 93 by updating the local side device cooperation service list information 91.

FIG. 9A shows an example of the local side device cooperation service list information 91, FIG. 9B shows an example of the server side device cooperation service list information 92, and FIG. 9C shows an example of the updated device cooperation service list information 93. Note that information not required in the difference processing has been omitted from FIGS. 9A to 9C.

First, the application information acquisition unit 405 compares the local side device cooperation service list information 91 with the server side device cooperation service list information 92 to detect added device cooperation services and updated device cooperation services.

It can be seen from the case of FIGS. 9A to 9C that an "Edit Photos" device cooperation service has been added to the server side device cooperation service list information 92 and the version of the "Watch TV" device cooperation service has been updated.

Hence, the application information acquisition unit 405 sets a condition attribute indicating an added or updated service in the updated device cooperation service list information 93, and passes the updated device cooperation service list information 93 to the service list display unit 406.

In the case of FIGS. 9A to 9C, the application information acquisition unit 405 sets the condition of the "Watch TV" device cooperation service to "Updated" and the condition of the "Edit Photos" device cooperation service to "New" in the updated device cooperation service list information 93, and then passes the updated device cooperation service list information 93 to the service list display unit 406.

Note that since the versions of the "Set to Record" and "Display Photos" device cooperation services have not been updated, the application information acquisition unit 405 sets the respective conditions of "Watch TV" and "Edit Photos" in the updated device cooperation service list information 93 at "No Change".

Having completed the service information difference processing, the application information acquisition unit 405 instructs the application management unit 408 to record the device cooperation service list information 92 obtained from the external server 107 in the local storage 407.

Figure 10A:
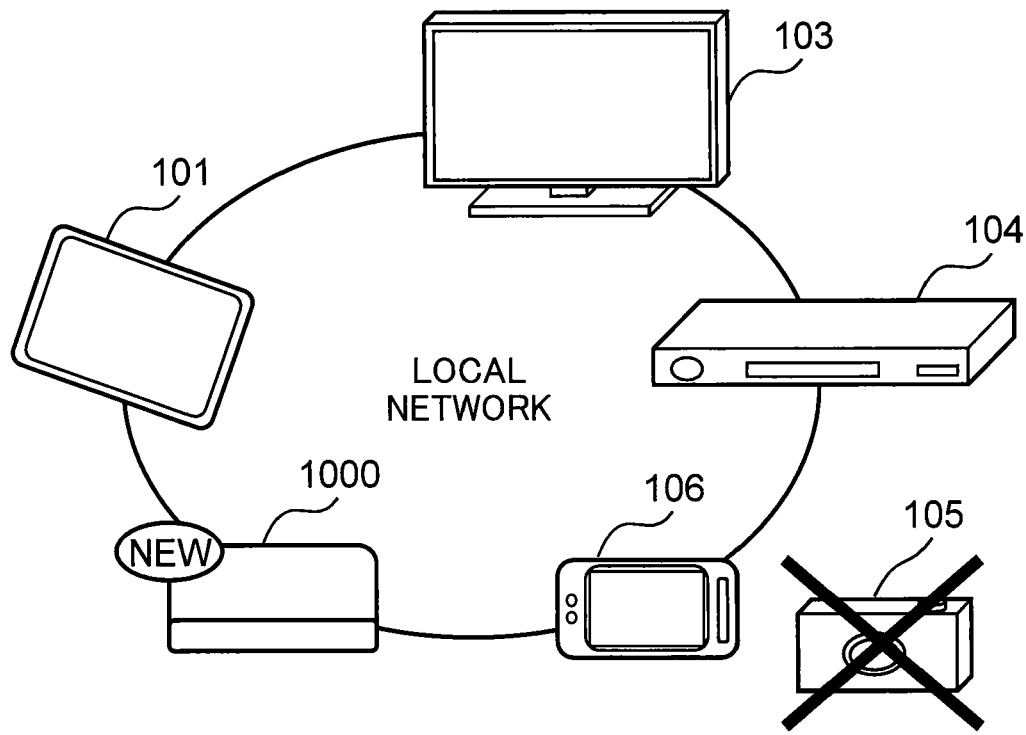
Figure 10B:
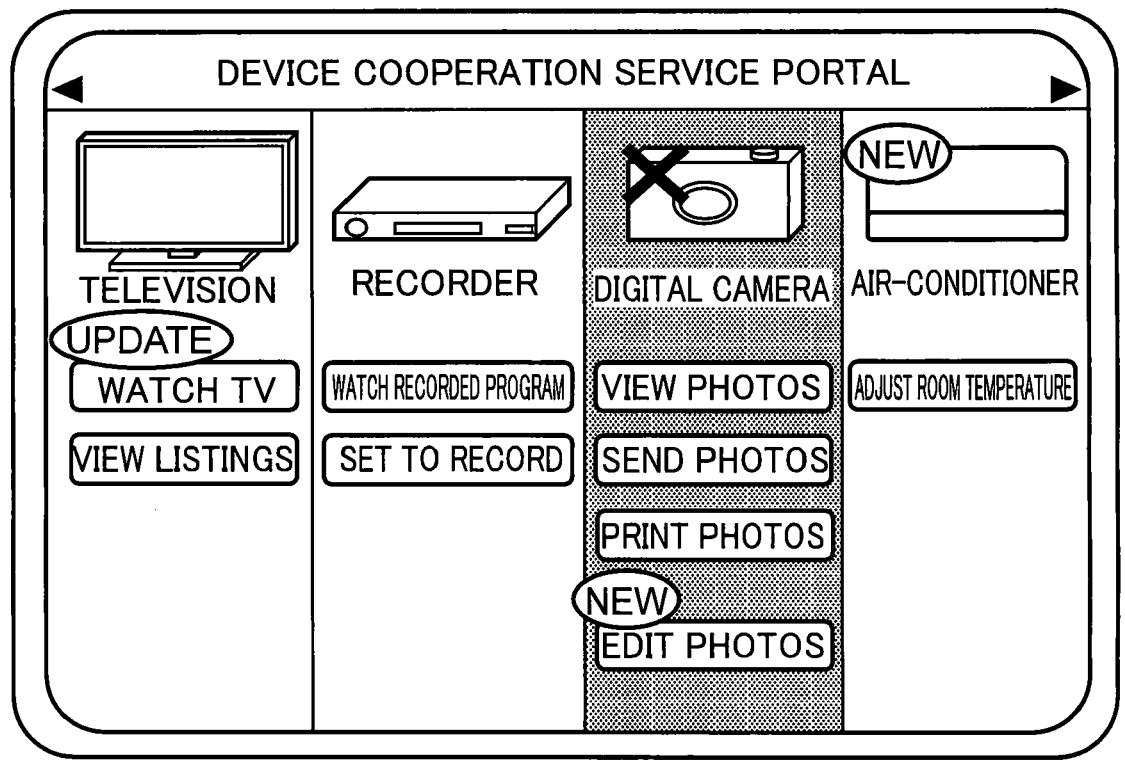

FIG. 10 are screen view showing examples of list images created by the service list display unit 406, wherein FIG. 10A shows an example of a local network configuration column and FIG. 10B shows an example of a service configuration column.

Figure 11:
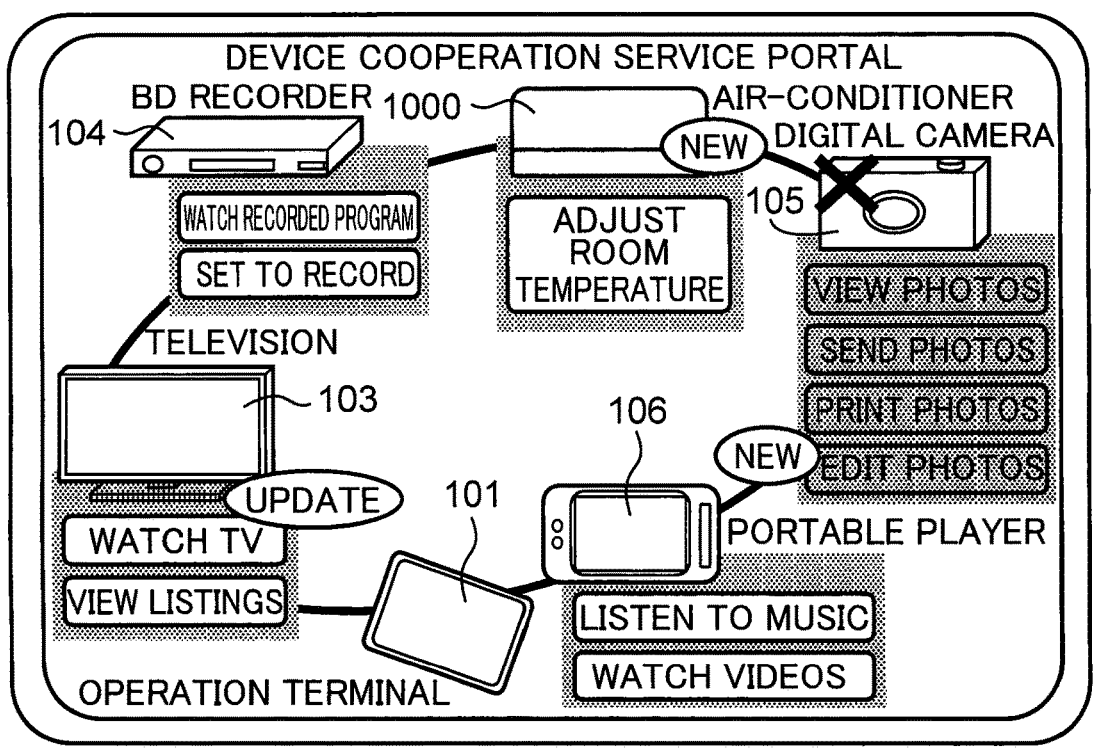
FIG. 11 is a screen view showing an example of a list image created by the service list display unit, wherein the list image is a service configuration column.

FIG. 11 is a screen view showing an example of a list image created by the service list display unit 406, wherein the list image shows another example of a service configuration column.

Note that although reference numerals have been added to FIGS. 10 and 11 to facilitate description thereof, these reference numerals are not displayed in actuality. The service list display unit 406 displays a list image on the basis of the updated device cooperation service list information 93 and the past and current owned device list information 64 received from the application information acquisition unit 405.

Conditions indicating which device cooperation services have been added and which device cooperation services have been updated are entered in the updated device cooperation service list information 93 received from the application information acquisition unit 405. Hence, when "New" has been entered as the condition, the service list display unit 406 determines that the corresponding device cooperation service is a newly added device cooperation service.

The service list display unit 406 then creates a list image from which the user can grasp that the newly added device cooperation service has been newly added.

In the example shown in FIG. 9C, a value corresponding to information "New" is entered into the "Condition" column of the service having the "Service Name" "Edit Photos" in the updated device cooperation service list information 93. Hence, the service list display unit 406 determines that the service having the "Service Name" "Edit Photos" is a newly added device cooperation service, and therefore displays a mark indicating a newly added device cooperation service in the vicinity of the icon of the newly added device cooperation service.

With respect to the digital camera 105, in the example of FIG. 10B, an icon indicating "Edit Photos" is displayed additionally in the display column of the digital camera 105, and a "NEW" icon is displayed in the vicinity of the "Edit Photos" icon as the mark indicating a newly added device cooperation service.

Further, when it is not possible to display all of the icons and the functions of the devices corresponding to the icons on a single screen, the required information can be displayed by, for example, performing a screen switching operation or the like. In the example of FIG. 10A, for example, although the portable player 106 is connected to the network, the icon and functions of the portable player 106 are not shown in the service configuration column in the example of FIG. 10B.

The reason for this is that although the icons of the television 103, the recorder 104, the digital camera 105, and an air-conditioner 1000 and the functions relating to these icons can be displayed within the display screen, the icon of the portable player 106 and the functions relating to the icon cannot be displayed. To display the icon of the portable player 106 and the functions relating to the icon, the screen display is switched by selecting a triangular icon displayed in the top right or top left of FIG. 10B, for example, and as a result, the icon of the portable player 106 and the functions relating to the icon are displayed.

In the example shown in FIG. 9C, a value corresponding to the information "Updated" is entered in the "Condition" column of the service having the "Service Name" "Watch TV" in the updated device cooperation service list information 93. Hence, the service list display unit 406 determines that the service having the value corresponding to the information "Updated" in the "Condition" column is an updated service, and therefore displays a mark indicating an updated device cooperation service in the vicinity of the icon of the updated device cooperation service.

In the example of FIG. 10B, an icon indicating "UPDATED" is displayed in the vicinity of the "Watch TV" icon in the display column of the television 103 as the mark indicating a version update. Note that the "NEW" and "UPDATED" icons are merely examples, and any icons from which the user can recognize added and updated device cooperation services may be displayed.

Further, a condition is entered in the past and current owned device list information 64 received from the application information acquisition unit 405 to indicate, in relation to each device, whether or not the device is currently connected to the local network and whether or not the device is newly connected to the local network. Hence, the service list display unit 406 refers to the condition in the past and current owned device list information 64, and if a device is not currently connected to the local network, creates a list image from which the user can grasp that device cooperation services using this device cannot currently be used.

In the past and current owned device list information 64 shown in FIG. 7, for example, a value corresponding to "Inactive" is entered as the condition of the device name "Digital Camera". Accordingly, the service list display unit 406 determines that the "Digital Camera" for which the value corresponding to "Inactive" is entered as the condition was connected to the local network in the past but is not currently connected to the local network, and then generates and displays an image indicating to the user that the digital camera has been determined not to be currently connected to the local network.

In the example of FIG. 10A, the service list display unit 406 displays a mark on the icon of the digital camera 105, which has been determined not to be currently connected to the local network, indicating that the digital camera 105 is not currently connected to the local network. In the examples of FIGS. 10A and 10B, an "x" mark is generated and displayed so as to overlap the icon of the digital camera 105, and in FIG. 10B, the background of the column of the digital camera 105 is displayed in gray. Note that adding the "x" mark and displaying the background in gray are merely examples of display methods, and any display method from which it can be understood that a device is not currently connected to the local network may be employed.

In the past and current owned device list information 64 shown in FIG. 7, a value corresponding to "New" is entered as the condition of the device name "Air-conditioner", for example. Accordingly, the service list display unit 406 determines that the "Air-conditioner" for which the value corresponding to "New" is entered as the condition was not connected to the local network in the past but is now newly connected to the local network, and then generates and displays an image indicating to the user that the air-conditioner has been determined to be now newly connected to the local network.

Further, in the examples of FIGS. 10A and 10B, the service list display unit 406 adds a "NEW" icon in the vicinity of the icon of the air-conditioner 1000, which has been determined to be currently connected to the local network anew, as a mark that serves as an example of an image indicating that the air-conditioner 1000 has been newly added. As a result, the user can recognize the air-conditioner 1000 as a newly added device.

In the example of FIG. 11, an "x" mark is displayed so as to overlap the icon of the digital camera 105, and in FIG. 11, a region including an icon indicating the functions of the digital camera 105 is displayed differently to a region including the icons of the other connected devices. In the example of FIG. 11, the region (a rectangle forming a boundary of the icon, excluding alphanumeric characters) including the icon indicating the functions is displayed in gray, whereas the region (a rectangle forming a boundary of the icon, excluding alphanumeric characters) including the icons of the other connected devices is displayed in white.

By displaying the "x" mark so as to overlap the icon of the digital camera 105, it can be understood visually that the digital camera is not currently connected to the local network.

Further, by displaying the region including the icon indicating the functions of the digital camera 105 in gray, it can be understood visually that the functions of the digital camera are not currently usable.

In this case, a "New" icon is displayed in the vicinity of the "Edit Photos" icon, whereby it can be understood visually that a function of the digital camera has been added.

With this configuration, it is possible to obtain an added function (a cooperative function) even in a device that has been removed from the local network.

Note that adding the "x" mark and displaying the region including the icon indicating the functions in gray are merely examples of display methods, and any display method from which it can be understood that a device is not currently connected to the local network may be employed.

In FIG. 11, similarly to FIG. 10B, the "UPDATED" icon is displayed in the vicinity of the "Watch TV" icon as the mark indicating a version update. As a result, the user can understand that the functions of a device have been updated (in this example, that the functions of the television have been updated).

In FIG. 11, similarly to FIG. 10B, the "NEW" icon is displayed in relation to the icon of the air-conditioner 1000 as the mark indicating that the air-conditioner 1000 has been newly added. As a result, the user can understand that a new device has been connected to the local network and grasp the functions of the device (in this example, the user can understand that the air-conditioner 1000 has been newly added and grasp the functions of the air-conditioner).

Hence, when a device not currently connected to the local network exists and a device cooperation service using this device is newly added or updated, the user is informed that since the device for realizing this device cooperation service is not currently connected to the local network, the device cooperation service cannot be used.

Thus, a user who removes a device from the local network due to a lack of interesting published device cooperation services at the time of purchase of the device can be notified that a device cooperation service relating to the device has been added or updated.

As a result, the user can be provided with an opportunity to reconnect the device, which has been stored in a cupboard or the like, for example, to the local network. Hence, a situation in which a device cooperation service desired by the user is published a while after purchase of the device but the user does not notice that the device cooperation service has been published and therefore leaves the device in a cupboard or the like without connecting the device to the local network can be prevented from occurring.

FIG. 12 is a view showing an example of a notification screen displayed when an owned device removed from the local network is reconnected to the local network, wherein an upper image is a local network display column and a lower image is a column displaying the device cooperation services of the owned device reconnected to the local network. Note that although reference numerals have been added to the respective devices in FIG. 12 to facilitate description thereof, these reference numerals are not displayed in actuality.

The device that has been newly connected to the local network transmits a participation notification to the local network by multicast. The device cooperation service execution apparatus 101, having received the participation notification, determines whether or not the device that transmitted the participation notification is an owned device. In this case, the device cooperation service execution apparatus 101 determines that the device which transmitted the participation notification is an owned device when the device information of the device is entered in the recorded owned device list information 63 recorded in the local storage 407.

The device cooperation service execution apparatus 101 then refers to the past and current owned device list information 64 to specify the device cooperation services that can be executed using the newly connected device, and displays the specified device cooperation services.

After determining that the newly connected device is not an owned device, on the other hand, the device cooperation service execution apparatus 101 asks the user whether or not the newly connected device may participate in the local network, and after receiving an input instruction from the user indicating that the newly connected device may participate, requests the device cooperation services that can be executed using the newly connected device from the external server 107.

In this case, the device cooperation service execution apparatus 101 requests the device cooperation services that can be executed by the newly connected device and the other devices currently connected to the local network by transmitting the current owned device list information 62 together with the device information of the newly connected device to the external server 107.

The device cooperation service execution apparatus 101 obtains device cooperation service list information indicating the device cooperation services that can be executed using the newly connected device and the other devices currently connected to the local network from the external server 107, and displays a list of the device cooperation services indicated by the obtained device cooperation service list information on the display unit 410.

In the example of FIG. 12, the digital camera 105 is newly connected to the local network. Accordingly, the icon of the digital camera 105 is added to the upper column, and an arrow icon is displayed to extend from the icon of the digital camera 105 toward the center of the local network display column.

As a result, the user can understand at a glance that the digital camera 105 has been added to the local network.

The list of device cooperation services that can be executed cooperatively by the digital camera 105 and the device cooperation service execution apparatus 101 is displayed in the lower column of FIG. 12. In the example of FIG. 12, "View Photos", "Send Photos", and "Print Photos" are displayed to indicate to the user that these device cooperation services can be executed using the digital camera 105.

Hence, when a new device participates in the local network, a list of the device cooperation services that can be executed using the device is displayed on the display unit 410 quickly, and therefore the user can use the device cooperation services executed by the newly connected device quickly by performing an operation such as switching a power supply of the device from OFF to ON.

Figure 13:
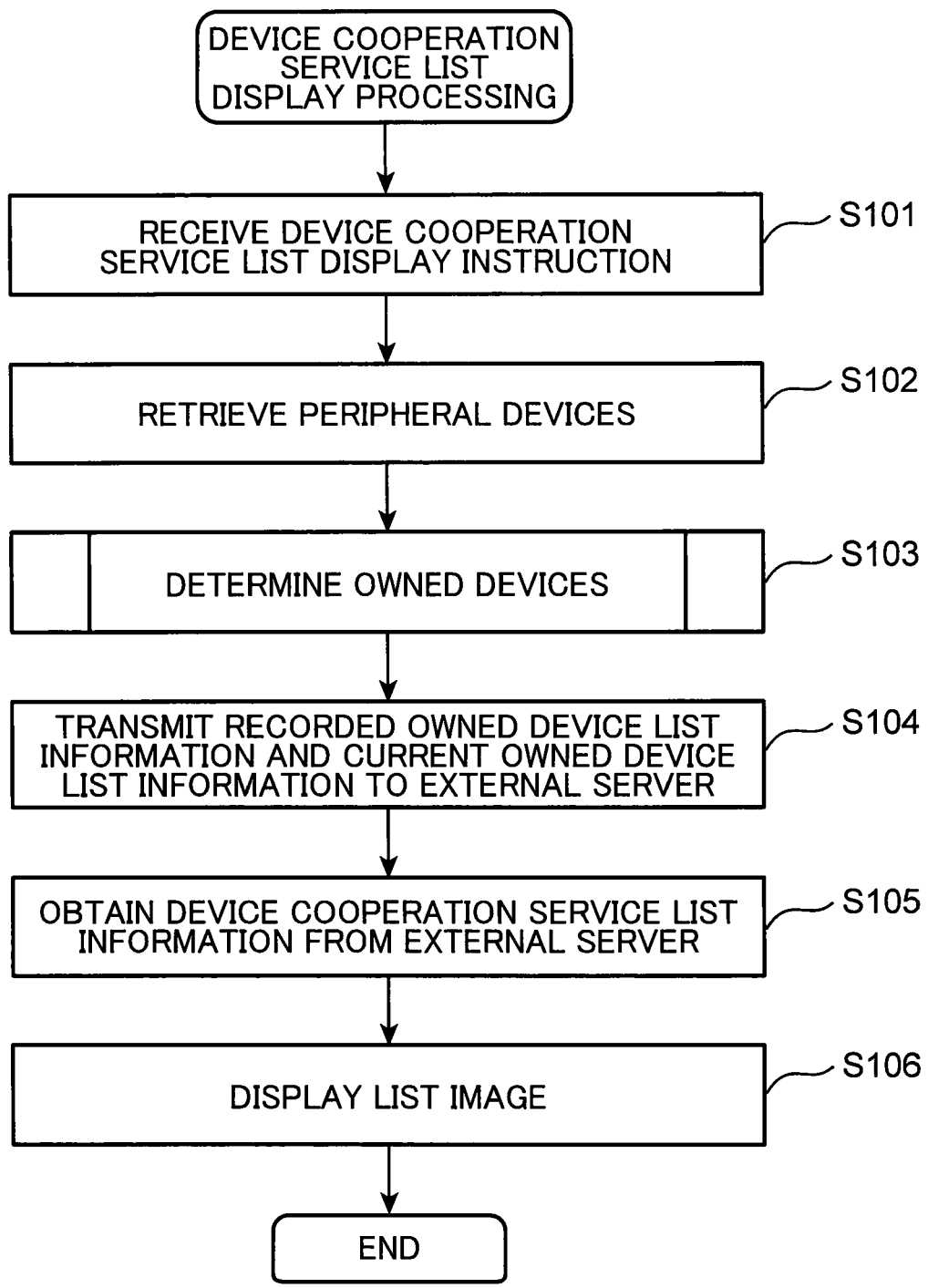
FIG. 13 is a flowchart showing device cooperation service list display processing, which is executed by the device cooperation service execution apparatus when a list of device cooperation services is displayed.

FIG. 13 is a flowchart showing device cooperation service list display processing, which is executed by the device cooperation service execution apparatus 101 when a list of device cooperation services is displayed.

First, the device retrieval unit 402 receives an instruction to display a list of device cooperation services (S101). In this case, the device retrieval unit 402 receives the instruction to display a list of device cooperation services as an input instruction from the user or a display request from a certain application that is executed on the device cooperation service execution apparatus 101, for example.

Next, the device retrieval unit 402 retrieves the peripheral devices connected to the local network (S102). Here, the device retrieval unit 402 creates the peripheral device list information 61 from the retrieval result, and passes the peripheral device list information 61 to the owned device determination unit 403.

Next, the owned device determination unit 403 determines whether or not the respective devices indicated by the peripheral device list information 61 are devices owned by the user (S103). This processing will be described in detail below using FIG. 14. As a result of the processing of S103, the current owned device list information 62 indicating the devices determined to be owned devices is created.

Next, the owned device management unit 404 creates the past and current owned device list information 64 by merging the current owned device list information 62 with the recorded owned device list information 63 stored in the local storage 407, and transmits the past and current owned device list information 64 to the external server 107 (S104).

Next, the external server 107 extracts the device cooperation services that can be executed by the group of devices indicated in the past and current owned device list information 64, creates device cooperation service list information indicating the device cooperation services that can be executed by the group of devices, and transmits the device cooperation service list information to the device cooperation service execution apparatus 101.

Next, the application information acquisition unit 405 obtains the device cooperation service list information transmitted from the external server 107 via the network interface 401 (S105).

Next, the service list display unit 406 creates the updated device cooperation service list information 93 from the server side device cooperation service list information 92 obtained by the application information acquisition unit 405 and the local side device cooperation service list information 91 recorded in the local storage 407.

Next, the service list display unit 406 creates the list image shown in FIG. 10 from the updated device cooperation service list information 93 and the past and current owned device list information 64, and displays the list image on the display unit 410 (S106).

Figure 14:
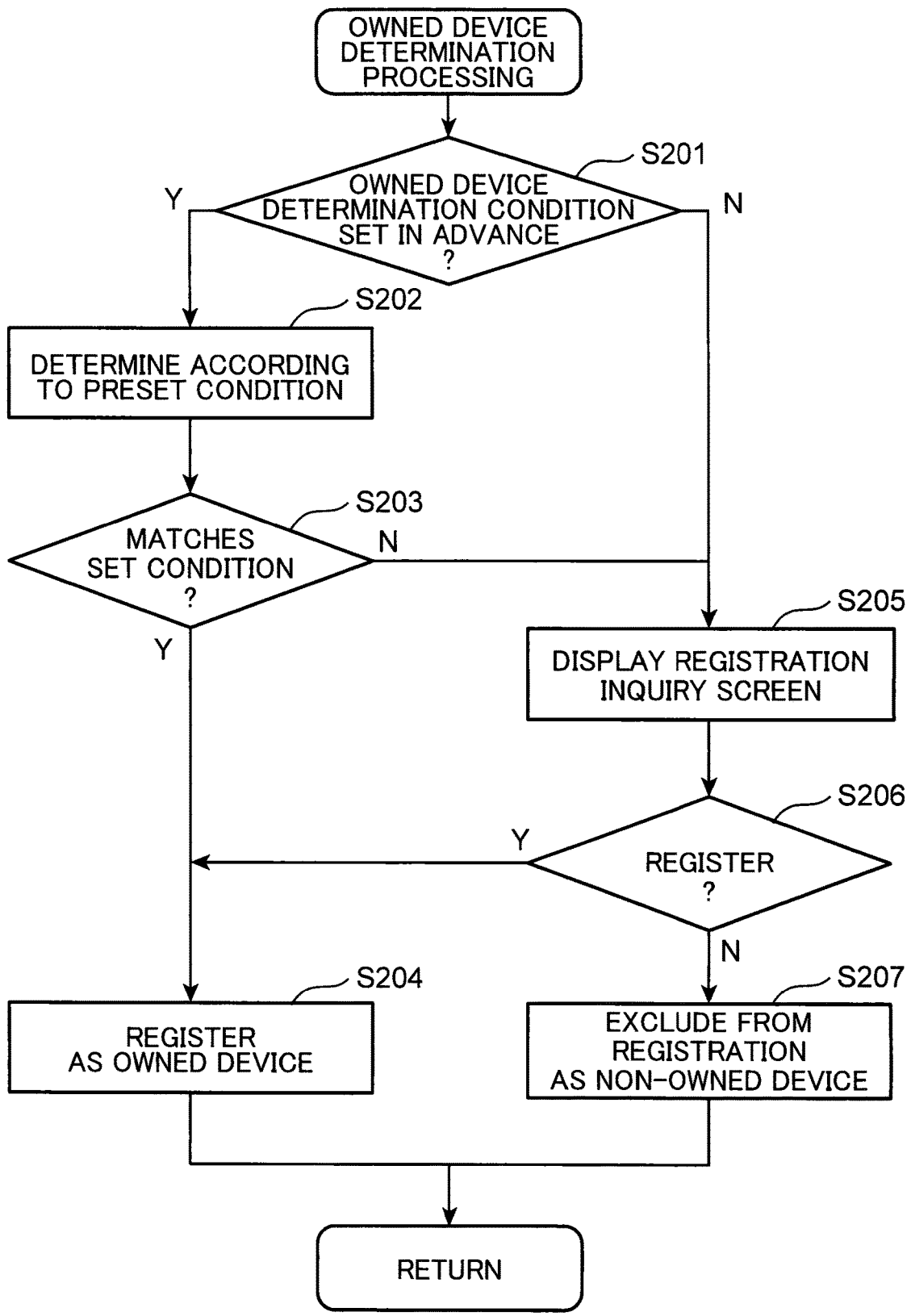
FIG. 14 is a flowchart showing owned device determination processing of FIG. 13.

FIG. 14 is a flowchart showing the owned device determination processing of FIG. 13. First, the owned device determination unit 403 determines whether or not the condition for determining an owned device has been set in advance (S201).

When the condition for determining an owned device has not been set in advance (N in S201), the owned device determination unit 403 displays a registration inquiry screen on the display unit 410 to ask the user whether or not to register the respective devices included in the peripheral device list information 61 created in S102 as owned devices (S205).

Figure 15:
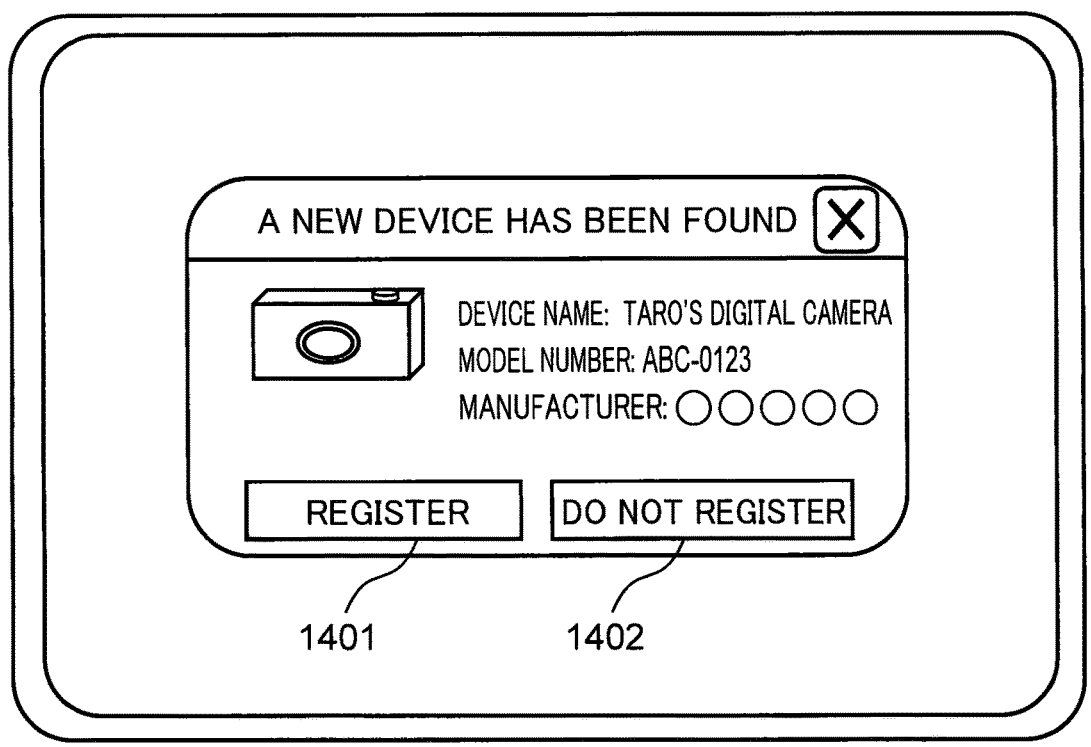
FIG. 15 is a view showing an example of a registration inquiry screen.

FIG. 15 is a view showing an example of the registration inquiry screen. As shown in FIG. 15, the device name, model number, and manufacturer of the inquiry subject device are displayed on the registration inquiry screen so that the content of the device is displayed to the user. Further, a registration button 1401 on which "Register" is written and a non-registration button 1402 on which "Do not register" is written are displayed below the manufacturer. When the user touches the registration button 1401, the device is registered as an owned device, and when the user touches the non-registration button 1402, the device is not registered as an owned device.

Note that in FIG. 15, the inquiry screen is displayed for a single device, but when a plurality of inquiry subject devices exist, the inquiry screen shown in FIG. 15 may be displayed for each device in sequence such that the user is asked whether or not to register each device in turn. Alternatively, the user may be caused to register owned devices by displaying the plurality of inquiry subject devices together with a list of check boxes on which the user is prompted to choose whether or not to register the respective devices.

When, on the other hand, it is determined in S201 that the condition for determining an owned device has been set in advance (Y in S201), the owned device determination unit 403 determines whether or not the peripheral devices match the preset condition (S202). Following conditions i) to v) may be cited as examples of the condition.

Condition i) is based on position. When an owned device is determined using Condition i), the owned device determination unit 403 causes the user to set a home position and a reference radius, for example, in advance. The owned device determination unit 403 then obtains the position of the device cooperation service execution apparatus 101 from a GPS sensor of the device cooperation service execution apparatus 101 during retrieval. When the position of the device cooperation service execution apparatus 101 is within a determination region defined by the home position and the reference radius, the owned device determination unit 403 determines all of the retrieved devices to be owned devices.

Further, to achieve an increase in precision, the owned device determination unit 403 may obtain the position of a retrieved device from a GPS sensor of the device during retrieval, and determine the device to be an owned device when the obtained position is within the determination region.

Furthermore, even when the position of the device cooperation service execution apparatus 101 is outside the determination region, the owned device determination unit 403 may determine a retrieved device to be an owned device as long as the position of the device is within the determination region.

Condition ii) is based on time. When an owned device is determined using Condition ii), the owned device determination unit 403 causes the user to set a time slot for using a device cooperation service in advance. When a retrieval time is within the preset time slot, the owned device determination unit 403 may determine all of the retrieved devices to be owned devices.

Condition iii) is based on a network ID. When an owned device is determined using Condition iii), the owned device determination unit 403 causes the user to set a network ID (an SSID (Service Set Identifier), for example) of a home router in advance. When the SSID of a retrieved device matches the preset SSID, the owned device determination unit 403 may determine the retrieved device to be an owned device.

Condition iv) is based on the device name and the manufacturer name. When an owned device is determined using Condition iv), the owned device determination unit 403 causes the user to set the device name or the manufacturer name in advance. When the device name or the manufacturer name of a retrieved device matches the preset device name or manufacturer name, the owned device determination unit 403 may determine the retrieved device to be an owned device.

The owned device determination unit 403 preferably determines the device name by a partial match rather than a full match. For example, when "Taro's *" (where "*" is a wildcard) is set in advance as the device name, devices having the device names "Taro's digital camera", "Taro's TV", and so on are determined to be owned devices.

Condition v) is based on the IP address. When an owned device is determined using Condition v), the owned device determination unit 403 causes the user to register a subnet of the IP address in advance. The owned device determination unit 403 may then determine a device having an IP address that matches the pre-registered subnet to be an owned device. For example, when the IP address=192. 168. 0. 1 and the subnet mask=255. 255. 255. 0, devices having IP addresses within a range of 192. 168. 0. 0 to 192. 168. 0. 255 are determined to be owned devices.

The owned device determination unit 403 may cause the user to specify the condition to be used to determine owned devices from Conditions i) to v) in advance so that owned devices are determined using the condition specified by the user. Here, one or a plurality of conditions may be specified from Conditions i) to v).

By causing the user to specify the condition in advance in this manner, situations in which the user determines a device to be an owned device unintentionally or fails to determine an owned device as an owned device can be forestalled.

Next, the owned device determination unit 403 determines Yin S203 in relation to the devices that match the preset condition, and registers these devices as owned devices by writing the device information of the devices determined to be owned devices in the current owned device list information 62 (S204).

In relation to devices that do not match the preset condition, on the other hand, the owned device determination unit 403 determines N in S203, and displays the inquiry screen asking the user whether or not to register these devices as owned devices on the display unit 410 (S205). In this case, the registration inquiry screen shown in FIG. 15 is displayed.

Next, upon reception of a registration instruction generated when the user touches the registration button 1401 (Y in S206), the owned device determination unit 403 registers the determination subject device as an owned device by writing the device information of the device in the current owned device list information 62 (S204).

Upon reception of a non-registration instruction generated when the user touches the non-registration button 1402 (N in S206), on the other hand, the owned device determination unit 403 excludes the determination subject device from the owned devices by not writing the device information of the device in the current owned device list information 62 (S207).

Note that the device subjected to the owned device determination processing is a device not entered in the recorded owned device list information 63 stored in the local storage 407, from among the devices retrieved in S102 of FIG. 13. In other words, devices that have been determined as owned devices and are entered in the recorded owned device list information 63 are excluded from the determination processing of FIG. 14. In so doing, processing costs of the processing for determining whether or not the retrieved devices are owned devices can be reduced.

Hence, devices corresponding to the preset condition, from among the devices connected to the local network, are registered as owned devices. It is therefore possible to prevent inadvertent registration of devices belonging to other people such as friends, which are connected to the local network temporarily, as owned devices. Accordingly, data transfer occurring when a device cooperation service is executed between the user device and a device of another person can be prevented, and as a result, the device information of the user device can be prevented from flowing out to the device of the other person.

Furthermore, a device that does not satisfy the condition is registered as an owned device with the permission of the user. Therefore, the device of a friend visiting the home of the user, for example, can be registered as an owned device such that a device cooperation service can be performed using the friend's device and the user device. Moreover, since the device of another person can be registered as an owned device with the permission of the user, inadvertent registration of the device of the other person to whom the user has not granted permission as an owned device can be prevented, and therefore the device information of the user device can be prevented from flowing out to the other person's device.

It is also possible to prevent a situation in which, when the device cooperation service execution apparatus 101 is connected to a public wireless LAN or the like outside the home, the device of another person connected to the same network is inadvertently recognized and registered as an owned device by the device cooperation service execution apparatus 101 such that device cooperation services are performed between the device cooperation service execution apparatus 101 and the device of the other person. As a result, the device of the other person can be prevented from stealing the personal information of the user from the device cooperation service execution apparatus 101.

Furthermore, when a new device not entered in the past and current owned device list information 64 is detected, the device cooperation service execution apparatus 101 notifies the user of the newly detected device, and therefore the user can be encouraged to use a newly purchased device. As a result, a reduction in cases where the user purchases a new device but abandons the new device without using it can be expected.

Note that in the first embodiment, the device cooperation services that can be executed between the connected devices and the unconnected devices are requested from the external server 107. This is merely an example, however, and the executable device cooperation services may be obtained by issuing a request to a database provided in the device cooperation service execution apparatus 101. This modified example will be described below.

Figure 21:
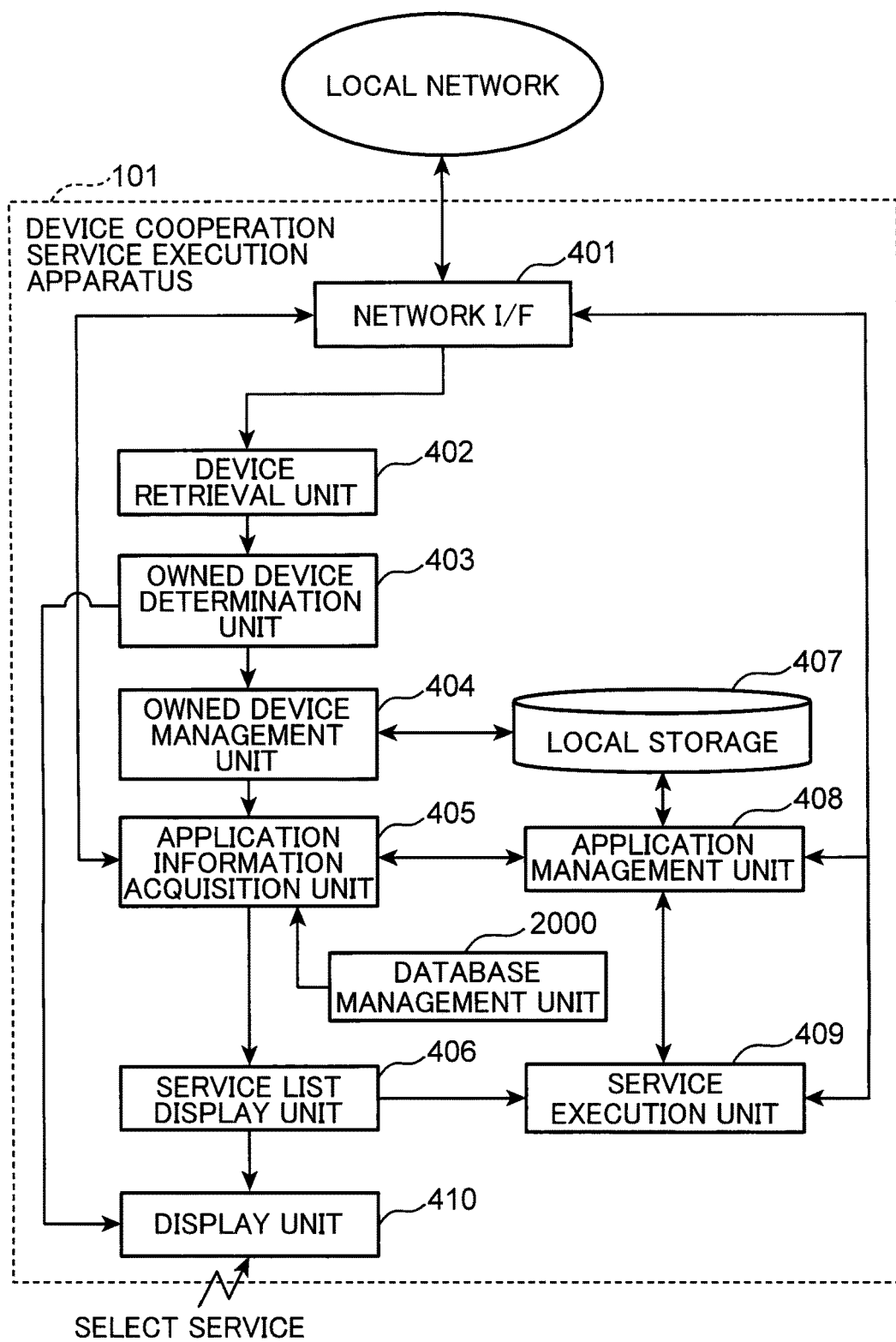
FIG. 21 is a block diagram showing a functional configuration of a modified example of the device cooperation service execution apparatus according to the first embodiment of the present invention.

FIG. 21 is a block diagram showing a modified example of the device cooperation service execution apparatus 101 according to the first embodiment of the present invention. In this modified example, the external server 107 is not required, and therefore the external server 107 has been omitted from FIG. 21.

The device cooperation service execution apparatus 101 further includes a database management unit 2000 that performs the role of the external server 107. The database management unit 2000 is constituted by a recording apparatus such as a hard disk drive and a computer-readable program for controlling the recording apparatus, and is realized by having a CPU execute the program.

The database management unit 2000 manages a database in which device cooperation services are associated with the device information of the devices required to execute the device cooperation services. The database management unit 2000, having been provided with the device list by the application information acquisition unit 405, extracts the device cooperation services that can be executed by the unconnected devices and connected devices on the device list from the database, and returns device cooperation service list information to the application information acquisition unit 405.

Second Embodiment

In the first embodiment, a case in which a device cooperation service is executed by the device cooperation service execution apparatus 101 and an owned device on the local network was described. In a second embodiment, a case in which the device cooperation service execution apparatus 101 is connected to an ad hoc network other than the local network such that a device cooperation service is executed by the device cooperation service execution apparatus 101 and a guest device connected to the ad hoc network will be described. Note that in the second embodiment, similar parts to the first embodiment have been omitted, and only modifications to the first embodiment will be described. Parts not described may be considered identical to the first embodiment.

Figure 16:
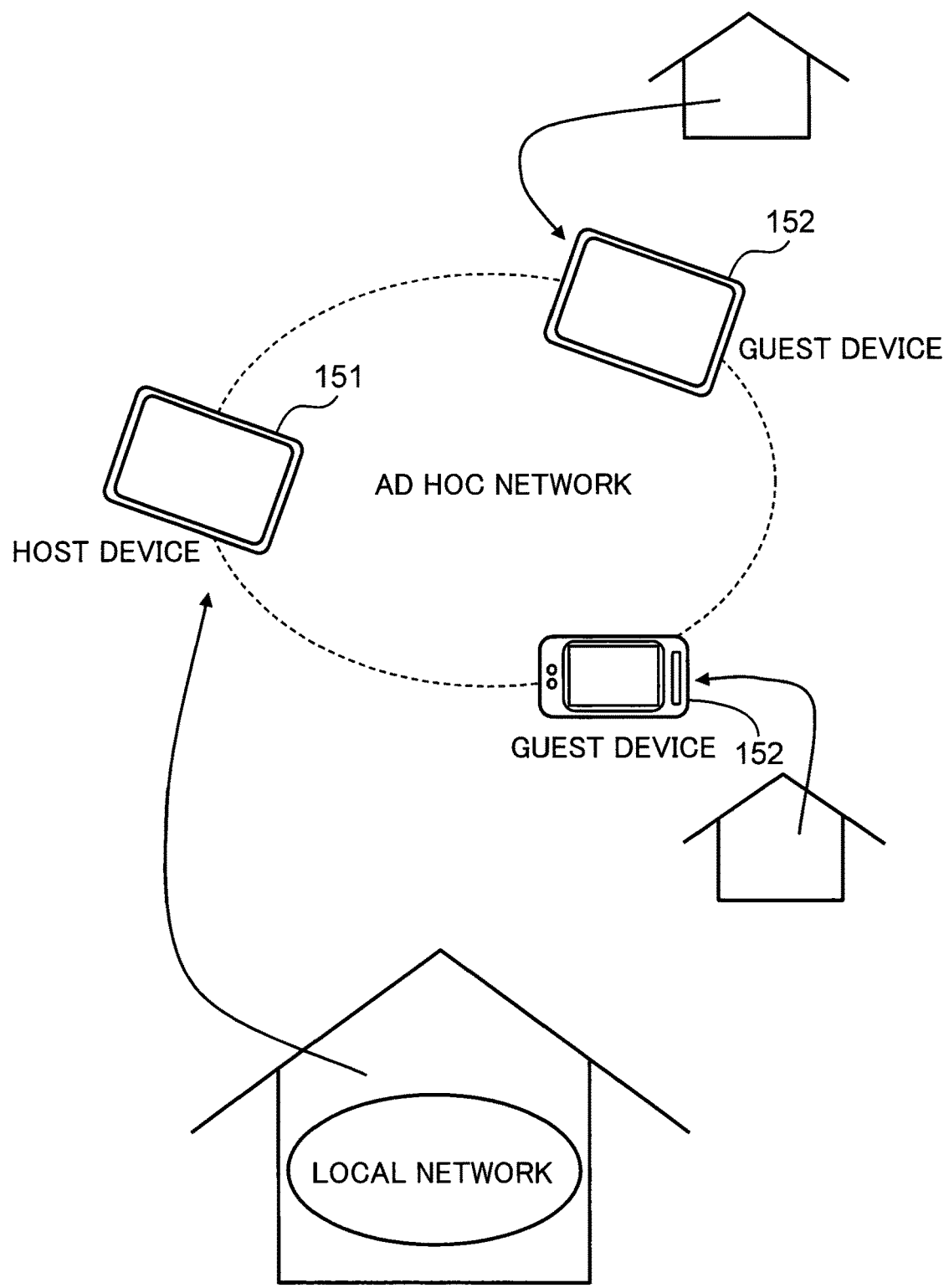
FIG. 16 is a view showing a configuration of an ad hoc network to which the device cooperation service execution apparatus is connected when taken outside the home.

FIG. 16 is a view showing a configuration of an ad hoc network to which the device cooperation service execution apparatus 101 is connected when taken outside the home. The ad hoc network is formed by grouping devices taken outside the home by various people. On the ad hoc network, one of the grouped devices is set as a host device 151, other devices are set as guest devices 152, and a connection is established between the guest devices and the host device using a communication protocol such as Wi-Fi DIRECT (registered trademark). On an ad hoc network, a user forms a network outside the home between his/her own device and a group of devices belonging to others in order to conduct device cooperation services such as exchanging and sharing photographs and video with others in the same location.

Hereafter, a case in which the device cooperation service execution apparatus 101 taken outside the home by the user serves as the host device 151 and a device taken outside the home by a person other than the user serves as the guest device 152 will be described. Note that any device which is compatible with the ad hoc network may be employed as the guest device 152, but in the following description, the device cooperation service execution apparatus 101 is employed.

Figure 17A:
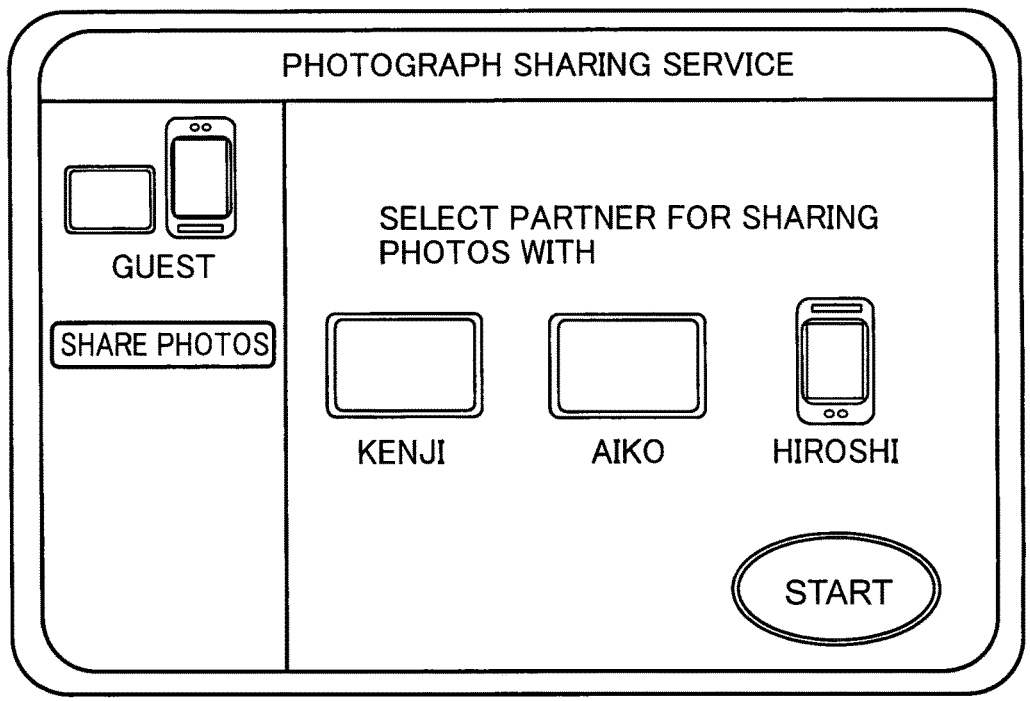
Figure 17B:
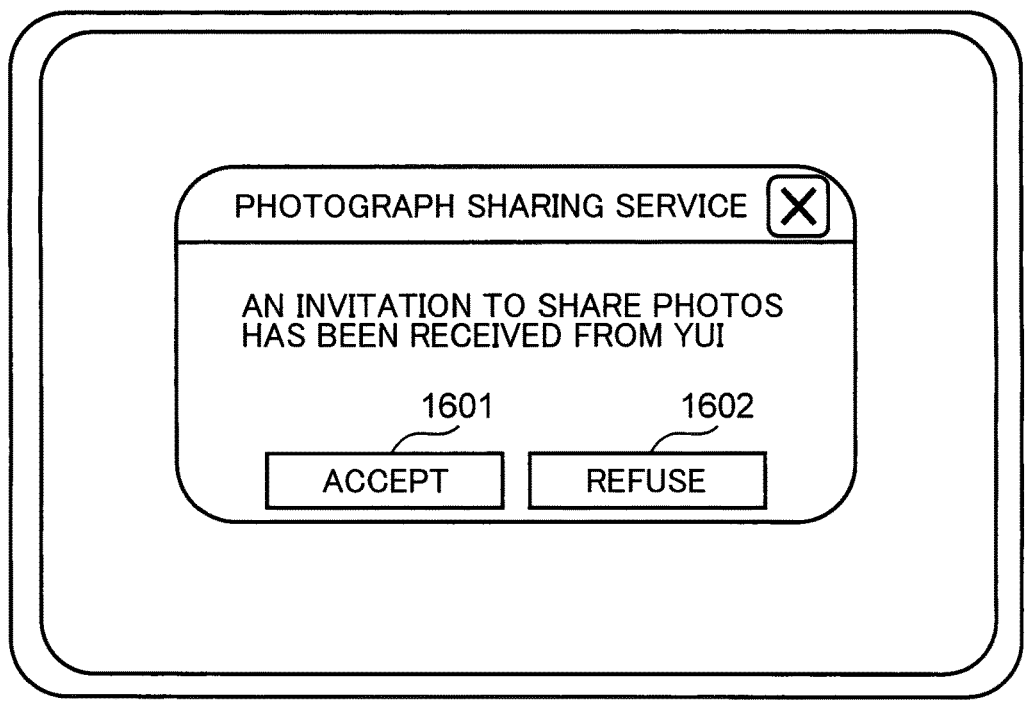

FIGS. 17A and 17B are views showing examples of screens displayed on the host device 151 and the guest device 152 when a device cooperation service is started outside the home, wherein FIG. 17A shows an example of the screen displayed on the host device 151 and FIG. 17B shows an example of the screen displayed on the guest device 152.

When a device cooperation service is used on an ad hoc network formed outside the home, the host device 151 selects the guest device 152 with which to cooperate in the device cooperation service. For example, when the host device 151 selects a photograph sharing service as the device cooperation service, a list of guest devices 152 on the ad hoc network that are capable of executing the photograph sharing service is displayed on the host device 151.

In the example of FIG. 17A, three user names "Kenji", "Aiko", and "Hiroshi" are displayed on the screen of the host device 151 to show that devices of three users exist on the ad hoc network as the guest devices 152 that are capable of executing the photograph sharing service.

The user of the host device 151 then selects a connection subject guest device 152 from the displayed list of guest devices 152. In this case, in FIG. 17A, the user of the host device 151 selects the connection subject device by touching an icon of the connection subject device, for example.

When the user of the host device 151 selects the connection subject device, a cooperation request relating to the device cooperation service is transmitted to the selected guest device 152 from the host device 151.

After receiving the cooperation request, the guest device 152 displays a message indicating that a cooperation request has been received from the host device 151 on a screen. The user name of the host device 151 that transmitted the cooperation request, the name of the device cooperation service, and so on may be used as content displayed on the guest device 152.

In the example of FIG. 17B, "An invitation to share photos has been received from Yui" is displayed in a dialog box of the photograph sharing service. Thus, a message indicating that a request for cooperation in the photograph sharing service has been received from Yui, who is the user of the host device 151, is displayed on the screen of the guest device 152.

The user of the guest device 152 checks the user name of the host device 151, the name of the device cooperation service, and so on displayed on the screen, and if the user of the guest device 152 wishes to accept the cooperation request from the user of the host device 151, the user touches an accept button 1601 on which "Accept" is written.

When, on the other hand, an unknown user name, the name of a device cooperation service that the user of the guest device 152 does not wish to execute, or the like is displayed on the screen of the guest device 152 such that the user of the guest device 152 decides to refuse the request from the user of the host device 151, the user touches a refuse button 1602 on which "Refuse" is written. In so doing, the user of the guest device 152 can halt execution of the device cooperation service.

FIG. 18 is a sequence diagram showing data content exchanged between the host device 151 and the guest devices 152 before the device cooperation service is started. First, the host device 151 transmits a search message by multicast to find the devices connected to the ad hoc network (S171).

Upon reception of the search message, the guest devices 152 return a search response, which is a response to the search message, to the host device 151 (S172). Next, the host device 151 transmits a terminal information confirmation message to the guest devices 152 that transmitted the search response (S173).

Upon reception of the terminal information confirmation message, the guest devices 152 return terminal information to the host device 151 (S174). Information such as a screen size and an OS version, for example, is included in the terminal information.

Next, the host device 151 reduces the number of device cooperation service execution subject guest devices 152 on the basis of the obtained terminal information, and presents the reduced number of guest devices 152 to the user as the guest devices 152 that are capable of executing the device cooperation service. By reducing the number of guest devices 152, a situation in which guest devices 152 that are not sophisticated enough to execute the device cooperation service are presented to the user can be prevented from occurring.

The host device 151 receives an instruction to prompt the user to select the guest devices 152 with which s/he wishes to cooperate from the group of devices capable of executing the presented device cooperation services (S175). At this time, the host device 151 also receives an instruction to prompt the user to select a device cooperation service to be executed cooperatively.

Next, the host device 151 transmits a device cooperation service cooperation request to the guest devices 152 selected by the user (S176). The cooperation request includes information indicating the device cooperation service selected by the user. Upon reception of the cooperation request, the guest devices 152 display a message indicating that a cooperation request has been received from the host device 151 on the display unit 410 (S177).

The guest devices 152 receive an input instruction to accept cooperation or an input instruction to refuse cooperation from the respective users thereof, and transmit an acceptance notification or a refusal notification to the host device 151 (S178).

Next, the host device 151 waits to receive input notifications or refusal notifications from all of the guest devices 152 to which the cooperation request was transmitted, and after receiving input notifications or refusal notifications from all of the guest devices 152, the host device 151 determines the guest devices 152 that accepted cooperation to be the guest devices 152 with which the device cooperation service is to be executed this time. The host device 151 then creates a list of the IP addresses of the guest devices 152 and the host device 151.

The host device 151 then transmits a service execution instruction including the created list of the IP addresses of the guest devices 152, an application ID serving as information used to identify the application for executing the device cooperation service, and the distribution destination URL of the application to the guest devices 152 that accepted cooperation (S180). Next, the host device 151 launches the application for executing the device cooperation service (S181).

After receiving the service execution instruction, the guest devices 152 download the application for executing the device cooperation service from the distribution destination URL, and launch the obtained application (S182). Here, when the application has already been installed, the guest devices 152 may launch the application without downloading the application.

When the application for executing the device cooperation service has been launched, the host device 151 and the guest devices 152 execute the device cooperation service while exchanging data by referring to the IP address list.

Upon reception of a device cooperation service termination instruction from the user, the host device 151 or the guest device 152 transmits a termination request to each device (S183), whereupon the device that transmitted the termination request terminates the launched application (S184). The devices that receive the termination request terminate the application at a reception timing of the service termination request (S185). In the flow described above, the application for executing the device cooperation service is launched and terminated simultaneously in the host device 151 and the guest devices 152.

Figure 19:
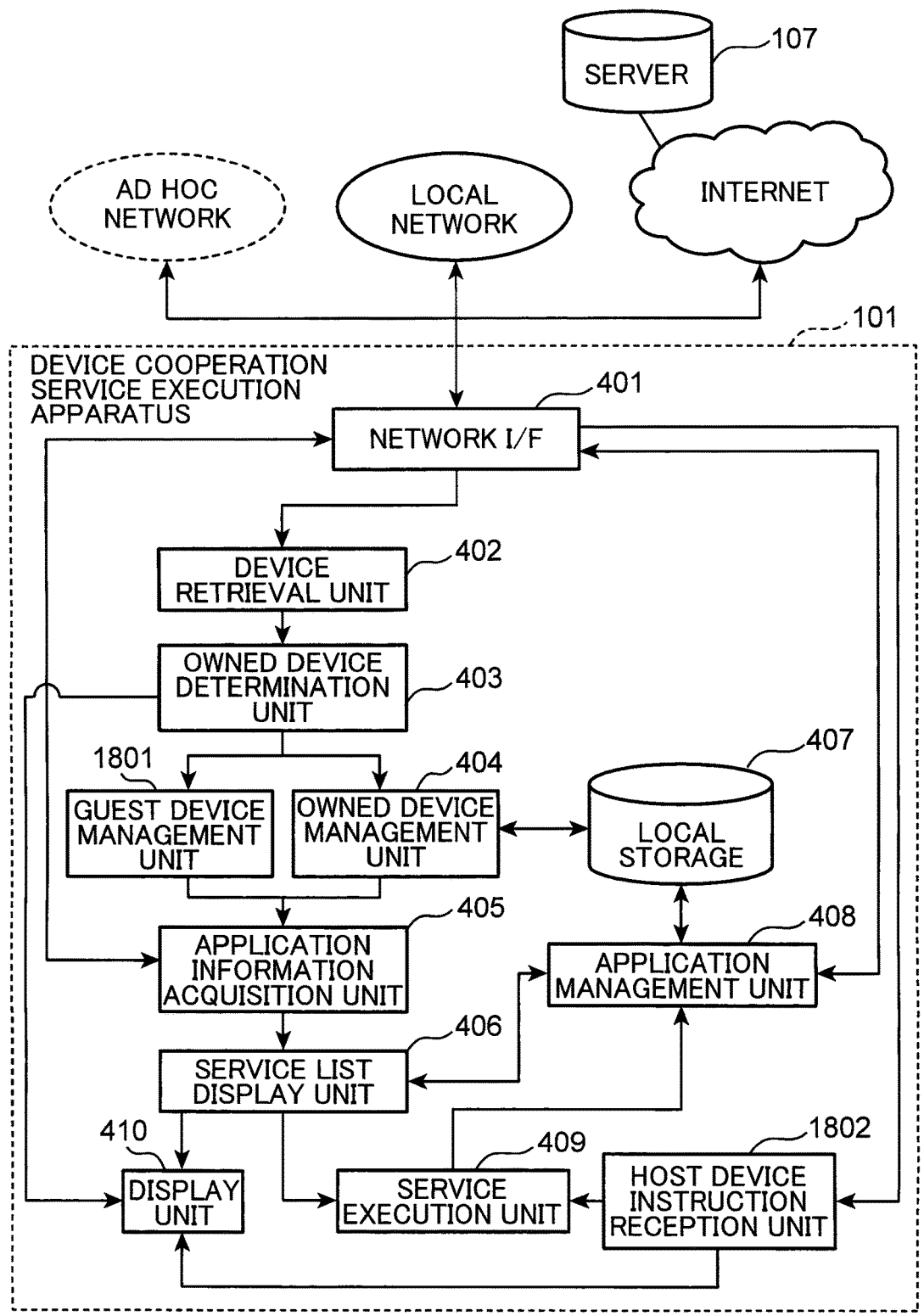
FIG. 19 is a block diagram showing a functional configuration of a device cooperation service execution apparatus according to a second embodiment.

FIG. 19 is a block diagram showing a functional configuration of the device cooperation service execution apparatus 101 according to the second embodiment. A difference to the block diagram of FIG. 4, showing the functional configuration of the first embodiment, is that a guest device management unit 1801 and a host device instruction reception unit 1802 have been added. The guest device management unit 1801 and the host device instruction reception unit 1802 are constituted by a computer-readable program and realized by having a CPU execute the program. Note, however, that this is merely an example, and instead, the guest device management unit 1801 and host device instruction reception unit 1802 may be constituted by dedicated hardware circuits. Alternatively, the device retrieval unit 402 to the service list display unit 406, the application management unit 408, the service execution unit 409, the guest device management unit 1801, and the host device instruction reception unit 1802 in FIG. 19 may be constituted by a single chip in an integrated circuit. Alternatively, all of the blocks of the device cooperation service execution apparatus 101 other than the display unit 410 in FIG. 18 may be constituted by a single chip in an integrated circuit.

The guest device management unit 1801 manages the devices determined to be non-owned devices by the owned device determination unit 403. In the first embodiment, the devices determined to be non-owned devices are not used to execute device cooperation services, but in the second embodiment, even devices determined to be non-owned devices are subject to device cooperation on the ad hoc network.

The guest device management unit 1801 sets each device determined to be a non-owned device as the guest device 152, and passes a device list showing a list of the guest devices 152 to the application information acquisition unit 405 without recording the list in the local storage 407.

The application information acquisition unit 405 transmits the device list received from the guest device management unit 1801 to the external server 107 in order to request the device cooperation services that can be executed by the guest devices 152 on the device list and the device cooperation service execution apparatus 101 from the external server 107, and obtains device cooperation service list information showing a list of the executable device cooperation services from the external server 107. Note that when the device cooperation service execution apparatus 101 includes the database management unit 2000, as shown in FIG. 21, the device cooperation service list information may be obtained by transmitting the device list to the database management unit 2000.

On the basis of the device cooperation service list information obtained by the application information acquisition unit 405, the service list display unit 406 displays the device cooperation services that can be executed cooperatively with the guest devices 152 on the display unit 410.

Here, the service list display unit 406 displays a list of the device cooperation services that can be executed by the owned devices and a list of the device cooperation services that can be executed by the guest devices 152 separately. For example, as shown in FIG. 2A, the device cooperation services that can be executed by the owned devices are displayed in association with the device names of the cooperation destination owned devices. The services that can be executed by the guest devices 152, on the other hand, are displayed in association with the names of the users who own the guest devices 152 rather than the device names.

By displaying the list of device cooperation services that can be executed cooperatively with the guest devices 152 separately from the list of device cooperation services that can be executed cooperatively with the owned devices in this manner, device cooperation services in which personal information is not exchanged, such as chat, can be managed separately from device cooperation services in which personal information is exchanged, such as address book synchronization.

The host device instruction reception unit 1802, after receiving a cooperation request from the guest device 152 via the network interface 401, displays the user name of the host device 151 and the name of the device cooperation service on the display unit 410 in order to prompt the user to determine whether or not to accept cooperation. After receiving an input instruction to accept cooperation from the user, the host device instruction reception unit 1802 transmits an acceptance notification to the host device 151 via the network interface 401, and waits for a service execution instruction from the host device 151.

Upon reception of the service execution instruction from the host device 151, the host device instruction reception unit 1802 instructs the service execution unit 409 to execute the application for executing the device cooperation service. If, at this time, the application for executing the device cooperation service is not installed, the service execution unit 409 instructs the application management unit 408 to install the application, and then launches the application once installation is complete.

Figure 20:
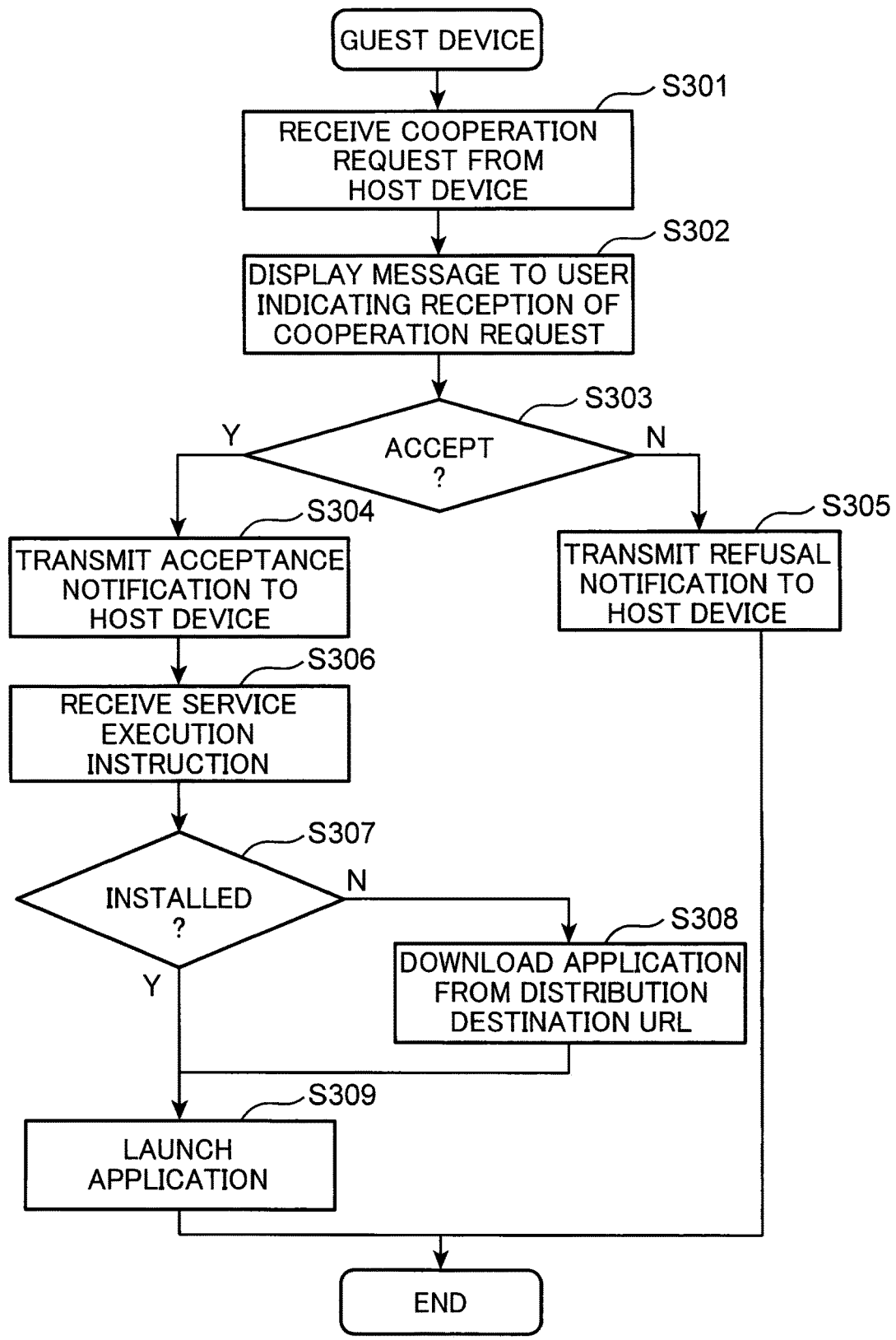
FIG. 20 is a flowchart showing processing performed by the device cooperation service execution apparatus according to the second embodiment of the present invention when the device cooperation service execution apparatus is a guest device.

FIG. 20 is a flowchart showing processing performed by the device cooperation service execution apparatus 101 according to the second embodiment of the present invention when the device cooperation service execution apparatus 101 is the guest device 152.

First, the host device instruction reception unit 1802 receives a cooperation request from the host device 151 (S301). Next, on the basis of the received cooperation request, the host device instruction reception unit 1802 displays a message indicating that a cooperation request relating to a device cooperation service has been received from the host device 151 on the display unit 410 (S302). In this case, the user name of the host device 151 that transmitted the cooperation request, the name of the device cooperation service, and so on are displayed on the display unit 410. Here, when an unknown user name or the name of a device cooperation service in which the user does not wish to cooperate is displayed, the user inputs an instruction to refuse cooperation.

Next, upon reception of the instruction input by the user to refuse cooperation (N in S303), the host device instruction reception unit 1802 transmits a refusal notification to the host device 151 (S305) and then terminates the processing without launching the application for executing the device cooperation service.

After receiving a determination result from the user indicating acceptance of cooperation (Y in S303), on the other hand, the host device instruction reception unit 1802 transmits an acceptance notification to the host device 151 (S304) and then waits for a service execution instruction from the host device 151.

Next, the host device instruction reception unit 1802 receives a service execution instruction including the list of the IP addresses of the host device 151 and the guest devices 152 in which the device cooperation service is to be executed, the application ID for executing the device cooperation service, and the distribution destination URL of the application from the host device 151 (S306).

Next, the service execution unit 409 determines whether or not the application corresponding to the received application ID is already installed (S307). When the service execution unit 409 determines that the application is not installed (N in S307), the application management unit 408 downloads the application from the URL indicated by the distribution destination URL (S308).

When installation by the application management unit 408 is complete, the service execution unit 409 launches the installed application (S309), whereupon the processing is terminated.

When it is determined in S307 that the application is already installed (Y in S307), on the other hand, the service execution unit 409 launches the installed application (S309), whereupon the processing is terminated.

Hence, the user can be allowed to determine whether or not to execute the device cooperation service while connected to the host device 151 that transmitted the device cooperation service cooperation request, and as a result, situations in which a device cooperation service is executed between the user device and the device of another person without the permission of the user such that the personal information of the user and so on is obtained wrongfully and misused can be prevented from occurring.

Summary of Embodiments (1) The device cooperation service execution apparatus described above executes a device cooperation service while cooperating with a device connected to a local network, and includes: a device retrieval unit that retrieves devices connected to the local network; a device information management unit that records device information relating to the devices retrieved by the device retrieval unit in a local storage; an application information acquisition unit that obtains device cooperation service list information indicating device cooperation services that can be executed by an unconnected device, which is a device whose device information is recorded in the local storage but which was not retrieved by the device retrieval unit, and a connected device, which is a device retrieved by the device retrieval unit; a service list display unit that displays a list of the device cooperation services indicated by the device cooperation service list information and a list of the unconnected devices and the connected devices; and a service execution unit that executes a device cooperation service selected by a user from the list of device cooperation services displayed by the service list display unit by launching an application for executing the device cooperation service, wherein the device cooperation service list information includes device information of devices required to execute the respective device cooperation services, and the service list display unit determines, on the basis of the device cooperation service list information and the device list, whether or not the unconnected device is included in the devices required to execute the respective device cooperation services, and when the unconnected device is included, notifies the user that a device cooperation service requiring the unconnected device cannot be selected.

According to this configuration, the devices connected to the local network are retrieved, whereupon device cooperation service list information indicating the device cooperation services that can be executed by the retrieved connected devices and the unconnected devices that were not retrieved this time but have been retrieved in the past is transmitted. In other words, device cooperation service list information indicating the device cooperation services that can be executed not only by the devices currently connected to the local network but also by devices that were connected to the local network in the past but are currently disconnected is transmitted. Here, the device cooperation services included in the device cooperation service list information include device cooperation services that can be executed using the unconnected devices as well as the connected devices.

A list of executable device cooperation services is then displayed such that the user is prompted to select a device cooperation service. At this time, the user is notified that the device cooperation services which can only be executed using an unconnected device cannot be selected.

Therefore, when the device required for the device cooperation service to be executed is currently removed from the local network, the user can be provided with an opportunity to connect the device to the local network.

Further, the user is notified that the device cooperation services which can only be executed using an unconnected device cannot be selected, and therefore the user can be prevented from mistakenly selecting a device cooperation service that cannot be executed. As a result, unintended operations and defects can be prevented from occurring in the device.

Moreover, since the list of unconnected devices and connected devices is displayed, the user can quickly recognize which devices are currently connected to the network. In addition, the devices owned by the user are presented to the user, and therefore the user is provided with a sense of satisfaction at owning the devices. Furthermore, since the list of unconnected devices is displayed, the user can recall devices purchased in the past. Note that a device cooperation service execution method and a device cooperation service execution program according to the present invention have identical features to the device cooperation service execution apparatus.

(2) The device cooperation service execution apparatus described above may further include an owned device determination unit that determines which of the devices retrieved by the device retrieval unit are owned devices owned by the user, wherein the owned device determination unit may determine a device that matches a condition specified in advance to be an owned device, and the device information management unit may record the device determined to be an owned device by the owned device determination unit in the local storage as an owned device.

According to this configuration, a device that is connected to the local network but does not satisfy a predetermined condition is not recognized as a device owned by the user, and therefore execution of device cooperation services using this device can be prevented. Hence, execution of a device cooperation service having as a cooperation destination another person's device connected temporarily to the local network can be prevented. As a result, the personal information of the user can be prevented from flowing out into the other person's device. Further, when the device cooperation service execution apparatus is connected to a public wireless LAN or the like outside the home, a situation in which another person's device connected to the same network is inadvertently recognized as an owned device and added to the device list, whereupon personal information is stolen by the other person's device, can be avoided.

(3) In the device cooperation service execution apparatus described above, when a new device, which is a device not recorded in the local storage, exists among the connected devices, the service list display unit may notify the user of the new device as a newly detected device.

According to this configuration, the user can be encouraged to use a newly purchased device, and therefore a situation in which the user purchases a device but abandons the device without using it can be avoided.

(4) The device cooperation service execution apparatus described above may further include an application information management unit that records the device cooperation service list information obtained by the application information acquisition unit in the local storage, wherein, when a new device cooperation service, which is a device cooperation service not recorded in the local storage, is included in the device cooperation service list information, the service list display unit preferably notifies the user of the new device cooperation service as a newly added device cooperation service.

According to this configuration, when a device cooperation service is newly added, the user is notified thereof. Hence, when an attractive device cooperation service is added to a device that has been removed from the local network and stored in a cupboard or the like due to a lack of interesting device cooperation services at the time of purchase, the user is provided with an opportunity to connect the device to the local network. In so doing, the user can try out the newly added device cooperation service.

(5) The device cooperation service execution apparatus described above may further include a guest device management unit that manages the devices determined not to be owned devices by the owned device determination unit as guest devices, wherein the guest device management unit may obtain device cooperation service list information indicating device cooperation services that can be executed cooperatively with the guest devices, and the service list display unit may display a list of the device cooperation services that are executed cooperatively with the guest devices separately from a list of device cooperation services that are executed cooperatively with the owned devices.

According to this configuration, the user can be notified of device cooperation services in which personal information is not exchanged, such as chat, separately from device cooperation services in which personal information is exchanged, such as address book synchronization. As a result, the user can be prevented from mistakenly selecting a device cooperation service such as address book synchronization, in which personal information is exchanged with the device of another person.

(6) The device cooperation service execution apparatus described above may further include a host device instruction reception unit that receives a cooperation request relating to a device cooperation service from a host device, wherein the host device instruction reception unit, after receiving the cooperation request from the host device, may notify a user of the cooperation request, and after receiving an input instruction to accept the cooperation request from the user, may transmit an acceptance notification relating to the cooperation request to the host device and launch an application for executing the device cooperation service.

According to this configuration, when the user takes the device cooperation service execution apparatus outside the home and connects the device cooperation service execution apparatus to a network outside the home such as an ad hoc network, the user can execute a device cooperation service with the device of an authorized other person.

(7) In the device cooperation service execution apparatus described above, the host device instruction reception unit, after receiving an input instruction to refuse the cooperation request from the user, may transmit a refusal notification to the host device, and need not launch the application for executing the device cooperation service.

According to this configuration, when the user takes the device cooperation service execution apparatus outside the home and connects the device cooperation service execution apparatus to a network outside the home such as an ad hoc network, a situation in which the device cooperation service execution apparatus of the user is set as a cooperation destination device and a device cooperation service is executed with the device of another person without the permission of the user can be prevented. As a result, a situation in which the personal information of the user is obtained wrongfully by the other person and misused can be prevented from occurring.

(8) In the device cooperation service execution apparatus described above, the application information acquisition unit may obtain the device cooperation service list information by transmitting the device list of the unconnected devices and the connected devices to an external server that manages a database in which the device cooperation services are associated with the device information of the devices required to execute the device cooperation services.

According to this configuration, the database in which the device cooperation services are associated with the device information is managed by the external server, and therefore means for managing the database can be omitted from the device cooperation service execution apparatus.

(9) The device cooperation service execution apparatus described above may further include a database management unit that manages a database in which the device cooperation services are associated with the device information of the devices required to execute the device cooperation services, wherein the application information acquisition unit may obtain the device cooperation service list information by providing the database management unit with the device list of the unconnected devices and the connected devices.

According to this configuration, the database in which the device cooperation services are associated with the device information is provided in the device cooperation service execution apparatus, and therefore the device cooperation service list information can be obtained quickly.

The device cooperation service execution apparatus according to the present invention can be manufactured and sold in the manufacturing industry for commercial purposes both continuously and repeatedly. The device cooperation service execution apparatus is of particularly use in the consumer device industry relating to the creation and execution of device cooperation services.

The invention claimed is:

1. A device cooperation service execution apparatus that executes a device cooperation service while cooperating with a device connected to a local network, comprising:
    a device retrieval unit that retrieves devices connected to the local network;
    a device information management unit that records device information relating to the devices retrieved by the device retrieval unit in a local storage;
    an application information acquisition unit that obtains device cooperation service list information indicating device cooperation services that can be executed by an unconnected device, which is a device whose device information is recorded in the local storage but which was not retrieved by the device retrieval unit, and a connected device, which is a device retrieved by the device retrieval unit;
    a service list display unit that determines on the basis of the device cooperation service list information and a device list of unconnected devices and connected devices whether or not the unconnected device is included in the devices required to execute the respective device cooperation services, and when the unconnected device is included, creates a list image which displays that a device cooperation service requiring the unconnected device cannot be selected and displays the list image which displays the list of the device cooperation services indicated by the device cooperation service list information and the list of the unconnected devices and the connected devices; and
    a service execution unit that executes a device cooperation service selected by a user from the list of device cooperation services displayed by the list image by launching an application for executing the device cooperation service,
    wherein the device cooperation service list information includes device information of devices required to execute the respective device cooperation services.

2. The device cooperation service execution apparatus according to claim 1, further comprising an owned device determination unit that determines which of the devices retrieved by the device retrieval unit are owned devices owned by the user,
    wherein the owned device determination unit determines a device that matches a condition specified in advance to be an owned device, and
    the device information management unit records the device determined to be an owned device by the owned device determination unit in the local storage as an owned device.

3. The device cooperation service execution apparatus according to claim 1, wherein, when a new device, which is a device not recorded in the local storage, exists among the connected devices, the service list display unit notifies the user of the new device as a newly detected device.

4. The device cooperation service execution apparatus according to claim 1, further comprising an application information management unit that records the device cooperation service list information obtained by the application information acquisition unit in the local storage,
    when a new device cooperation service, which is a device cooperation service not recorded in the local storage, is included in the device cooperation service list information, the service list display unit notifies the user of the new device cooperation service as a newly added device cooperation service.

5. The device cooperation service execution apparatus according to claim 2, further comprising a guest device management unit that manages the devices determined not to be owned devices by the owned device determination unit as guest devices,
    wherein the guest device management unit obtains device cooperation service list information indicating device cooperation services that can be executed cooperatively with the guest devices, and
    the service list display unit displays a list of the device cooperation services that are executed cooperatively with the guest devices separately from a list of device cooperation services that are executed cooperatively with the owned devices.

6. The device cooperation service execution apparatus according to claim 5, further comprising a host device instruction reception unit that receives a cooperation request relating to a device cooperation service from a host device,
    wherein the host device instruction reception unit, after receiving the cooperation request from the host device, notifies a user of the cooperation request, and after receiving an input instruction to accept the cooperation request from the user, transmits an acceptance notification relating to the cooperation request to the host device and launches an application for executing the device cooperation service.

7. The device cooperation service execution apparatus according to claim 6, wherein the host device instruction reception unit, after receiving an input instruction to refuse the cooperation request from the user, transmits a refusal notification to the host device and does not launch the application for executing the device cooperation service.

8. The device cooperation service execution apparatus according to claim 1, wherein the application information acquisition unit obtains the device cooperation service list information by transmitting the device list of the unconnected devices and the connected devices to an external server that manages a database in which the device cooperation services are associated with the device information of the devices required to execute the device cooperation services.

9. The device cooperation service execution apparatus according to claim 1, further comprising a database management unit that manages a database in which the device cooperation services are associated with the device information of the devices required to execute the device cooperation services,
 wherein the application information acquisition unit obtains the device cooperation service list information by providing the database management unit with the device list of the unconnected devices and the connected devices.

10. A device cooperation service execution method using a device cooperation service execution apparatus that executes a device cooperation service while cooperating with a device connected to a local network, the method comprising:
 a device retrieval step in which the device cooperation service execution apparatus retrieves devices connected to the local network;
 a device information management step in which the device cooperation service execution apparatus records device information relating to the devices retrieved in the device retrieval step in a local storage;
 an application information acquisition step in which the device cooperation service execution apparatus obtains device cooperation service list information indicating device cooperation services that can be executed by an unconnected device, which is a device whose device information is recorded in the local storage but which was not retrieved in the device retrieval step, and a connected device, which is a device retrieved in the device retrieval step;
 a service list display step in which the device cooperation service execution apparatus determines on the basis of the device cooperation service list information and a device list of unconnected devices and connected devices whether or not the unconnected device is included in the devices required to execute the respective device cooperation services, and when the unconnected device is included, creates a list image which displays that a device cooperation service requiring the unconnected device cannot be selected, and displays the list image which displays the list of the device cooperation services indicated by the device cooperation service list information and the list of the unconnected devices and the connected devices; and
 a service execution step in which the device cooperation service execution apparatus executes a device cooperation service selected by a user from the list of device cooperation services displayed in the service list display step by launching an application for executing the device cooperation service,
 wherein the device cooperation service list information includes device information of devices required to execute the respective device cooperation services.

11. A non-transitory computer-readable recording medium which stores a device cooperation service execution program for executing a device cooperation service while cooperating with a device connected to a local network, the program causing a computer to function as:
 a device retrieval unit that retrieves devices connected to the local network;
 a device information management unit that records device information relating to the devices retrieved by the device retrieval unit in a local storage;
 an application information acquisition unit that obtains device cooperation service list information indicating device cooperation services that can be executed by an unconnected device, which is a device whose device information is recorded in the local storage but which was not retrieved by the device retrieval unit, and a connected device, which is a device retrieved by the device retrieval unit;
 a service list display unit that determines on the basis of the device cooperation service list information and a device list of unconnected devices and connected devices whether or not the unconnected device is included in the devices required to execute the respective device cooperation services, and when the unconnected device is included, creates a list image which displays that a device cooperation service requiring the unconnected device cannot be selected and displays the list image which displays the list of the device cooperation services indicated by the device cooperation service list information and the list of the unconnected devices and the connected devices; and
 a service execution unit that executes a device cooperation service selected by a user from the list of device cooperation services displayed by the list image by launching an application for executing the device cooperation service,
 wherein the device cooperation service list information includes device information of devices required to execute the respective device cooperation services.

12. The device cooperation service execution apparatus according to claim 1, wherein, the list image includes an image which indicates the device cooperation service requiring the unconnected device, and a visual marking which overlaps the image and indicates that the device cooperation service requiring the unconnected device cannot be selected.

* * * * *